(12) United States Patent
Yester

(10) Patent No.: US 8,340,894 B2
(45) Date of Patent: Dec. 25, 2012

(54) METHOD OF DYNAMIC INTERSECTION MAPPING

(75) Inventor: John L. Yester, Birmingham, MI (US)

(73) Assignee: Honda Motor Co., Ltd., Tokyo (JP)

( * ) Notice: Subject to any disclaimer, the term of this patent is extended or adjusted under 35 U.S.C. 154(b) by 483 days.

(21) Appl. No.: 12/576,078

(22) Filed: Oct. 8, 2009

(65) Prior Publication Data

US 2011/0087433 A1 Apr. 14, 2011

(51) Int. Cl.
*G08G 1/16* (2006.01)
(52) U.S. Cl. ........ 701/301; 701/437; 340/436; 340/438; 340/995.2
(58) Field of Classification Search .................. 701/300, 701/301, 117, 400, 409, 431, 437, 302; 340/3.41, 340/435, 436, 438, 903, 995.2
See application file for complete search history.

(56) References Cited

U.S. PATENT DOCUMENTS

| | | |
|---|---|---|
| 5,289,181 A | 2/1994 | Watanabe et al. |
| 5,485,161 A | 1/1996 | Vaughn |
| 5,539,398 A | 7/1996 | Hall et al. |
| 5,939,976 A | 8/1999 | Sasaki et al. |
| 5,940,010 A | 8/1999 | Sasaki et al. |
| 5,999,878 A | 12/1999 | Hanson |
| 6,047,234 A | 4/2000 | Cherveny et al. |
| 6,163,750 A | 12/2000 | Nojima |
| 6,169,495 B1 | 1/2001 | Koike |
| 6,307,484 B1 | 10/2001 | Sasaki et al. |
| 6,356,840 B2 | 3/2002 | Kusama |
| 6,370,475 B1 | 4/2002 | Breed et al. |
| 6,385,539 B1 | 5/2002 | Wilson et al. |
| 6,405,128 B1 | 6/2002 | Bechtolsheim et al. |
| 6,405,132 B1 | 6/2002 | Breed et al. |
| 6,516,267 B1 | 2/2003 | Cherveny et al. |
| 6,516,273 B1 | 2/2003 | Pierowicz et al. |
| 6,526,348 B1 | 2/2003 | McDonough |

(Continued)

FOREIGN PATENT DOCUMENTS

JP 2005165643 6/2005

(Continued)

OTHER PUBLICATIONS

International Search Report and Written Opinion mailed Dec. 12, 2011 in International Application No. PCT/US2010/60695.

(Continued)

*Primary Examiner* — Thomas Black
*Assistant Examiner* — Ce Li
(74) *Attorney, Agent, or Firm* — Plumsea Law Group, LLC

(57) ABSTRACT

A motor vehicle is provided having a collision warning system that can map an upcoming road section for the motor vehicle. The system can evaluate potential paths for the road section based on vehicle travel history information through it. The system can receive the information from a transmitter proximate the road section, such as a roadside transmitter or one or more nearby vehicles having traversed the road section. The road section can include an intersection and the system can determine a lane configuration for at least a portion of it based on vehicle travel history information. The system can calculate a threat of collision for the motor vehicle with a target vehicle based on map data obtained from estimated paths or lane configurations for the road section. Methods pertaining to mapping a road section and operation of the system are also provided.

20 Claims, 13 Drawing Sheets

U.S. PATENT DOCUMENTS

| | | | |
|---|---|---|---|
| 6,526,352 B1 | 2/2003 | Breed et al. | |
| 6,624,782 B2 | 9/2003 | Jocoy et al. | |
| 6,640,188 B2 | 10/2003 | Hashida | |
| 6,658,356 B2 | 12/2003 | Chen et al. | |
| 6,720,920 B2 | 4/2004 | Breed et al. | |
| 6,735,515 B2 | 5/2004 | Bechtolsheim et al. | |
| 6,763,301 B2 | 7/2004 | McDonough | |
| 6,768,944 B2 | 7/2004 | Breed et al. | |
| 6,810,327 B2 | 10/2004 | Akashi | |
| 6,816,779 B2 | 11/2004 | Chen et al. | |
| 6,836,781 B2 | 12/2004 | McDonough | |
| 6,853,913 B2 | 2/2005 | Cherveny et al. | |
| 6,859,731 B2 | 2/2005 | Takafuji et al. | |
| 6,865,479 B2 | 3/2005 | Chen et al. | |
| 6,868,410 B2 | 3/2005 | Fortin et al. | |
| 7,046,827 B2 | 5/2006 | Chen et al. | |
| 7,072,764 B2 | 7/2006 | Donath et al. | |
| 7,079,946 B2 | 7/2006 | Hunzinger | |
| 7,085,637 B2 | 8/2006 | Breed et al. | |
| 7,102,496 B1* | 9/2006 | Ernst et al. | 340/436 |
| 7,110,880 B2 | 9/2006 | Breed et al. | |
| 7,124,025 B2 | 10/2006 | Okada et al. | |
| 7,124,027 B1 | 10/2006 | Ernst, Jr. et al. | |
| 7,133,775 B2 | 11/2006 | Adamski et al. | |
| 7,151,467 B2 | 12/2006 | Fujita et al. | |
| 7,194,347 B2 | 3/2007 | Harumoto et al. | |
| 7,202,776 B2 | 4/2007 | Breed | |
| 7,209,051 B2 | 4/2007 | Shankwitz et al. | |
| 7,295,925 B2 | 11/2007 | Breed et al. | |
| 7,317,406 B2 | 1/2008 | Wolterman | |
| 7,406,381 B2 | 7/2008 | Obata | |
| 7,418,346 B2 | 8/2008 | Breed et al. | |
| 7,426,437 B2 | 9/2008 | Breed et al. | |
| 7,433,889 B1 | 10/2008 | Barton | |
| 7,440,830 B2 | 10/2008 | Isaji et al. | |
| 7,440,850 B2 | 10/2008 | Kim | |
| 7,486,202 B2 | 2/2009 | Konishi et al. | |
| 7,519,472 B1 | 4/2009 | Grigsby et al. | |
| 7,720,026 B2 | 5/2010 | Chen et al. | |
| 2003/0016143 A1 | 1/2003 | Ghazarian | |
| 2003/0134645 A1 | 7/2003 | Stern et al. | |
| 2004/0236543 A1 | 11/2004 | Stephens | |
| 2005/0004753 A1* | 1/2005 | Weiland et al. | 701/208 |
| 2005/0033505 A1 | 2/2005 | Zatz | |
| 2005/0143889 A1 | 6/2005 | Isaji et al. | |
| 2006/0173611 A1 | 8/2006 | Takagi et al. | |
| 2006/0217879 A1* | 9/2006 | Ikeuchi et al. | 701/208 |
| 2007/0005609 A1 | 1/2007 | Breed | |
| 2007/0013497 A1 | 1/2007 | Watanabe | |
| 2007/0021915 A1* | 1/2007 | Breed et al. | 701/301 |
| 2007/0027583 A1 | 2/2007 | Tamir et al. | |
| 2007/0073463 A1 | 3/2007 | Sherony et al. | |
| 2007/0124067 A1 | 5/2007 | Kim et al. | |
| 2007/0159354 A1* | 7/2007 | Rosenberg | 340/902 |
| 2007/0171095 A1 | 7/2007 | Mochizuki | |
| 2007/0208493 A1 | 9/2007 | Downs et al. | |
| 2007/0208494 A1 | 9/2007 | Chapman et al. | |
| 2007/0208495 A1 | 9/2007 | Chapman et al. | |
| 2007/0208496 A1 | 9/2007 | Downs et al. | |
| 2007/0208501 A1 | 9/2007 | Downs et al. | |
| 2007/0265777 A1* | 11/2007 | Munakata | 701/301 |
| 2007/0276600 A1 | 11/2007 | King et al. | |
| 2007/0280503 A1 | 12/2007 | Kubota et al. | |
| 2007/0282532 A1 | 12/2007 | Yamamoto et al. | |
| 2008/0015771 A1 | 1/2008 | Breed et al. | |
| 2008/0015772 A1 | 1/2008 | Sanma et al. | |
| 2008/0021641 A1 | 1/2008 | Kim | |
| 2008/0024323 A1 | 1/2008 | Kadaba | |
| 2008/0040023 A1 | 2/2008 | Breed et al. | |
| 2008/0040029 A1 | 2/2008 | Breed | |
| 2008/0040032 A1 | 2/2008 | Ohashi | |
| 2008/0042815 A1 | 2/2008 | Breed et al. | |
| 2008/0046165 A1 | 2/2008 | Downs et al. | |
| 2008/0071465 A1 | 3/2008 | Chapman et al. | |
| 2008/0082261 A1* | 4/2008 | Tengler et al. | 701/210 |
| 2008/0106436 A1 | 5/2008 | Breed | |
| 2008/0120025 A1 | 5/2008 | Naitou et al. | |
| 2008/0128190 A1 | 6/2008 | Tsutsumi et al. | |
| 2008/0133136 A1* | 6/2008 | Breed et al. | 701/301 |
| 2008/0140318 A1 | 6/2008 | Breed | |
| 2008/0147253 A1 | 6/2008 | Breed | |
| 2008/0150786 A1 | 6/2008 | Breed | |
| 2008/0154495 A1 | 6/2008 | Breed | |
| 2008/0154629 A1 | 6/2008 | Breed et al. | |
| 2008/0161986 A1 | 7/2008 | Breed | |
| 2008/0161987 A1 | 7/2008 | Breed | |
| 2008/0162036 A1 | 7/2008 | Breed | |
| 2008/0165018 A1 | 7/2008 | Breed | |
| 2008/0167819 A1 | 7/2008 | Breed | |
| 2008/0167821 A1 | 7/2008 | Breed | |
| 2008/0177462 A1* | 7/2008 | Yoshioka et al. | 701/200 |
| 2008/0204277 A1* | 8/2008 | Sumner | 340/910 |
| 2008/0215202 A1 | 9/2008 | Breed | |
| 2008/0215231 A1 | 9/2008 | Breed | |
| 2008/0243378 A1 | 10/2008 | Zavoli | |
| 2009/0030605 A1 | 1/2009 | Breed | |
| 2009/0033540 A1 | 2/2009 | Breed et al. | |
| 2009/0043497 A1 | 2/2009 | Tashev et al. | |
| 2009/0043506 A1 | 2/2009 | Breed | |
| 2009/0048750 A1 | 2/2009 | Breed | |
| 2009/0070031 A1 | 3/2009 | Ginsberg | |
| 2009/0082917 A1 | 3/2009 | Adachi | |
| 2009/0224942 A1 | 9/2009 | Goudy et al. | |
| 2009/0248284 A1* | 10/2009 | Yoshioka et al. | 701/117 |
| 2010/0106413 A1 | 4/2010 | Mudalige | |
| 2010/0223002 A1* | 9/2010 | Oonichi et al. | 701/201 |

FOREIGN PATENT DOCUMENTS

| | | |
|---|---|---|
| JP | 2005242943 | 9/2005 |
| JP | 2006011607 | 1/2006 |
| JP | 2007141114 | 6/2007 |
| JP | 2007200052 | 8/2007 |
| JP | 2007279004 | 10/2007 |
| JP | 2007328573 | 12/2007 |
| JP | 2008009870 | 1/2008 |
| JP | 2008101458 | 5/2008 |
| JP | 2008132894 | 6/2008 |
| JP | 2008198162 | 8/2008 |
| JP | 2008276688 | 11/2008 |

OTHER PUBLICATIONS

Notification of The Transmittal of The International Search Report and The Written Opinion of the International Searching Authority, or The Declaration mailed in PCT Application No. PCT/US2010/051761.

International Search Report and Written Opinion mailed Apr. 20, 2012 in International Application No. PCT/US2012/021844.

International Preliminary Report on Patentability (including Written Opinion of the ISA) mailed Apr. 19, 2012 in International Application No. PCT/US2010/051761.

* cited by examiner

METHOD OF DYNAMIC INTERSECTION MAPPING

BACKGROUND

1. Field of the Invention

The present invention relates generally to motor vehicles and in particular to a collision warning system for a motor vehicle.

2. Description of Related Art

Collision warning systems have been previously proposed. Collision warning systems can alert a driver to potential hazards posed by other vehicles or objects near or on a roadway. Some collision warning systems use visual and/or audible messages to alert a driver of potential collisions.

SUMMARY OF THE INVENTION

The invention pertains to an automated collision warning system. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted into kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

Aspects of the invention pertain to a motor vehicle having a collision warning system that can map an upcoming road section for the motor vehicle. The system can evaluate potential paths for the road section based on vehicle travel history information for vehicles that have traversed the road section, which it can receive from a transmitter proximate the road section, such as a roadside transmitter or one or more nearby vehicles having traversed the road section. The road section can include an intersection of two or more roads, for which the system can determine a lane configuration for at least a portion of the road section based on vehicle travel history information. The system can calculate a threat of collision for the motor vehicle with a target vehicle at the road section based on the potential paths or the estimated lane configuration.

In one aspect, the invention can provide a method of operating a collision warning system in a motor vehicle, comprising the steps of: mapping a road section proximate the motor vehicle including: receiving vehicle travel history information for the road section from a transmitter proximate the road section; and evaluating potential paths for the road section based on the vehicle travel history information; determining a first path for the motor vehicle to traverse the road section; receiving a signal transmitted by a target vehicle; determining a second path for the target vehicle to traverse the road section; and calculating a threat of collision for the motor vehicle with the target vehicle including comparing the first and second paths.

In another aspect, the invention can provide a method of operating a collision warning system in a motor vehicle, comprising: dynamically mapping an upcoming road section for the motor vehicle traveling along a second road, the upcoming road section including an intersection of the second road with a first road, dynamically mapping the upcoming road section including: receiving first vehicle travel history information for the road section from a first supplemental vehicle having recently traversed the intersection along the first road; receiving second vehicle travel history information for the road section from a second supplemental vehicle having recently traversed the intersection along the first road; and estimating a lane configuration for the first road as it exits the intersection including comparing the first and second vehicle travel history information; receiving a signal transmitted by a target vehicle; and calculating a threat of collision for the motor vehicle with the target vehicle based on the estimated lane configuration.

In a further aspect, the invention can provide a motor vehicle comprising: a transmitter configured to transmit signals for a vehicle communications network; a receiver configured to receive signals for a vehicle communications network; a navigation system; and a collision warning system configured to perform actions comprising: mapping an upcoming road section being identified by the navigation system including: receiving via the receiver vehicle travel history information for the road section from a transmitter proximate the road section; evaluating potential paths for the road section based on the vehicle travel history information; determining a first path for the motor vehicle for the road section; receiving via the receiver a signal transmitted by a target vehicle; determining a second path for the target vehicle for the road section; and calculating a threat of collision for the motor vehicle with the target vehicle including comparing the first and second paths.

Other systems, methods, features and advantages of the invention will be, or will become, apparent to one of ordinary skill in the art upon examination of the following figures and detailed description. It is intended that all such additional systems, methods, features and advantages included within this description and this summary, be within the scope of the invention, and be protected by the following claims.

BRIEF DESCRIPTION OF THE DRAWINGS

Aspects and features of the invention can better be understood with reference to the following drawings and descriptions. The example components in the figures are not necessarily to scale, but are provided to illustrate various principles. Moreover, in the figures, like reference numerals designate corresponding parts throughout the different views.

DETAILED DESCRIPTION

Figure 1:
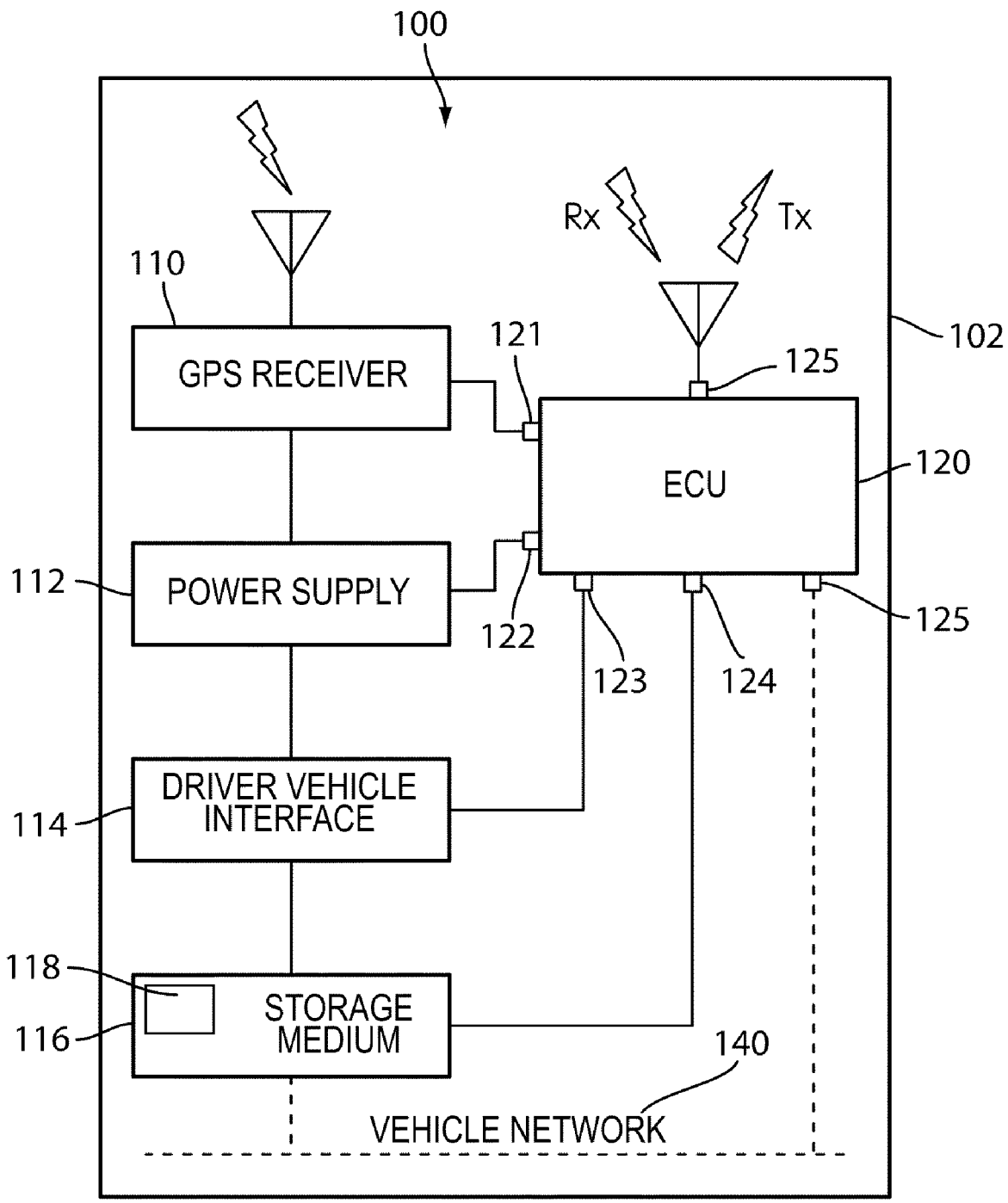
FIG. 1 is a schematic view of an example collision warning system.

FIG. 1 is a schematic view of an example collision warning system 100 that is configured to be used within a subject vehicle 102. Collision warning system 100 can be a system configured to detect potential collisions as well as to alert a driver or passenger to potential collisions. For purposes of clarity, only some components of a motor vehicle that can be relevant to collision warning system 100 are illustrated. Furthermore, in other embodiments and alternative configurations, additional components can be added or removed.

Collision warning system 100 can include provisions for receiving GPS information. In some cases, collision warning system 100 can include GPS receiver 110. In an exemplary embodiment shown, GPS receiver 110 can be used for gathering GPS information for any systems of a motor vehicle, including, but not limited to GPS based navigation systems (not shown).

Collision warning system 100 can include provisions for referencing map data, which can be stored separate from and/or as part of a vehicle navigation system, and can be received periodically and/or on an as-needed basis. The map data can include detailed road network information such as route information, lane information (e.g., number of lanes, lane configuration, lane types), path limitations (e.g., one-way street limitations), turn restrictions, path elevations and grades, physical barriers like gates, indications of restricted access, scheduled construction, etc.

In some cases, collision warning system 100 can include a storage medium 116 for onboard storage of information including map data 118. In some cases, collision warning 100 can receive off-board map data, which can be stored in storage medium 116 or in another storage medium. Storage medium 116 can be one of several types of storage media or combinations of storage media including short and long term memory devices, volatile and non-volatile memory, etc. In other cases, map data can be stored as part of a GPS based navigation system (not shown), which can be accessed by collision warning system 100. Storage medium 116 can include provisions for storing map data relatively long term such as regional map data for a primary geographical location of the vehicle, and/or short term, such as proximate map data for locations encountered as the vehicle travels beyond its primary location and data is received from sources such as a central repository or road based transmitters.

Collision warning system 100 can include provisions for receiving map information, such as baseline map data for a geographical area related to the vehicle, updated map data for other geographical areas, updates to previously stored map data like map data 118 stored in the storage medium, etc. The map data can be provided by various sources including a centralized source, such as a navigation system provider and/or decentralized sources like road-based transmitters providing map data for nearby road features. As an example, map data from a centralized source can include map data provided by the company known as NAVTEQ. Collision warning system 100 can reference map data in other ways, such as via electronically receiving map data on an as-needed basis from a centralized system according to the vehicle's location, from road-based transmitters, and/or from other vehicles.

Collision warning system 100 can include provisions for powering one or more devices. In some cases, collision warning system 100 can include power supply 112. Generally, power supply 112 can be any type of power supply associated with a motor vehicle. In some cases, power supply 112 can be a car battery. In other cases, power supply 112 can be another type of power supply available within subject vehicle 102.

Collision warning system 100 can include provisions for communicating with a driver. In some embodiments, collision warning system 100 can include driver vehicle interface 114. In some cases, driver vehicle interface 114 can include provisions for transmitting information to a driver and/or passenger. In other cases, driver vehicle interface 114 can include provisions for receiving information from a driver and/or passenger. In an exemplary embodiment, driver vehicle interface 114 can include provisions for transmitting and receiving information from a driver and/or passenger.

Subject vehicle 102 can include provisions for communicating, and in some cases controlling, the various components associated with collision warning system 100. In some embodiments, collision warning system 100 can be associated with a computer or similar device. In the current embodiment, collision warning system can include electronic control unit 120, hereby referred to as ECU 120. In one embodiment, ECU 120 can be configured to communicate with, and/or control, various components of collision warning system 100. In addition, in some embodiments, ECU 120 can be configured to control additional components of a motor vehicle that are not shown.

ECU 120 can include a number of ports that facilitate the input and output of information and/or power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

The example ports and provisions associated with ECU 120 described herein are optional. Some embodiments can include a given port or provision, while others can exclude it. The following description discloses many of the possible ports and provisions that can be used, however, it should be kept in mind that not every port or provision must be used or included in a given embodiment.

In some embodiments, ECU 120 can include first port 121 for communicating with GPS receiver 110. In particular, ECU 120 can be configured to receive GPS information from GPS receiver 110. In addition, ECU 120 can include second port 122 for receiving power from power supply 112. Also, ECU 120 can include a third port 123 for communicating with driver vehicle interface 114. In particular, ECU 120 can be configured to transmit information to driver vehicle interface 114, as well as to receive information from driver vehicle interface 114. Further, ECU 120 can include a fourth port 124 for communicating with storage medium 116. In particular, ECU 120 can be configured to transmit and receive information from storage medium 116, such as map data 118.

A collision warning system can include provisions for communicating with one or more vehicles using a vehicle communication network. The term "vehicle communication network" as used throughout this detailed description and in the claims refers to any network utilizing motor vehicles and roadside units as nodes. Vehicle communication networks can be used for exchanging various types of information between motor vehicles and/or roadside units. An example of such a vehicular network is a dedicated short range communication (DSRC) network. In some cases, DSRC networks can be configured to operate in the 5.9 GHz band with bandwidth of approximately 75 MHz. Furthermore, DSRC networks can have a range of approximately 1000 m.

Collision warning system 100 can include provisions for communicating with one or more components of a motor vehicle that are not associated directly, or indirectly with collision warning system 100. In some cases, ECU 120 can include additional ports for communicating directly with one or more additional devices of a motor vehicle, including various sensors or systems of the motor vehicle. In an exemplary embodiment, ECU 120 can include fifth port 125 for communicating with vehicle network 140 via one or more DSRC devices. Fifth port 125 can be associated with a DSRC antenna that is configured to transmit and/or receive vehicle information over one or more vehicle networks 140.

By providing communication between ECU 120 and vehicle network 140, ECU 120 can have access to additional information concerning subject vehicle 102. For instance, in some cases, ECU 120 can be configured to receive information related to various operating conditions of a motor vehicle. Examples of information that can be received via vehicle network 140 include, but are not limited to: vehicle speed, engine speed, braking conditions, as well as other parameters associated with the operating condition of subject vehicle 102.

A collision warning system can include provisions for controlling one or more systems in a motor vehicle that can be utilized during a collision, or that can be used to help avoid a collision. For example, in some embodiments, ECU 120 can be configured to communicate with a brake actuator to help control braking prior to, or during a collision. In other embodiments, ECU 120 can be configured to communicate with an electric seat belt pre-tensioner to help control a seat belt during a collision. In still other embodiments, any systems of a motor vehicle can be controlled using ECU 120. In some embodiments, ECU 120 can be configured with additional ports for communicating with other systems of a motor vehicle, including systems used during a collision. In other embodiments, ECU 120 can be configured to communicate with these systems using a vehicle network. With this arrangement, a collision warning system can be configured to control one or more systems that can be used to help avoid a collision or to increase the safety of one or more occupants during a collision.

Figure 2:
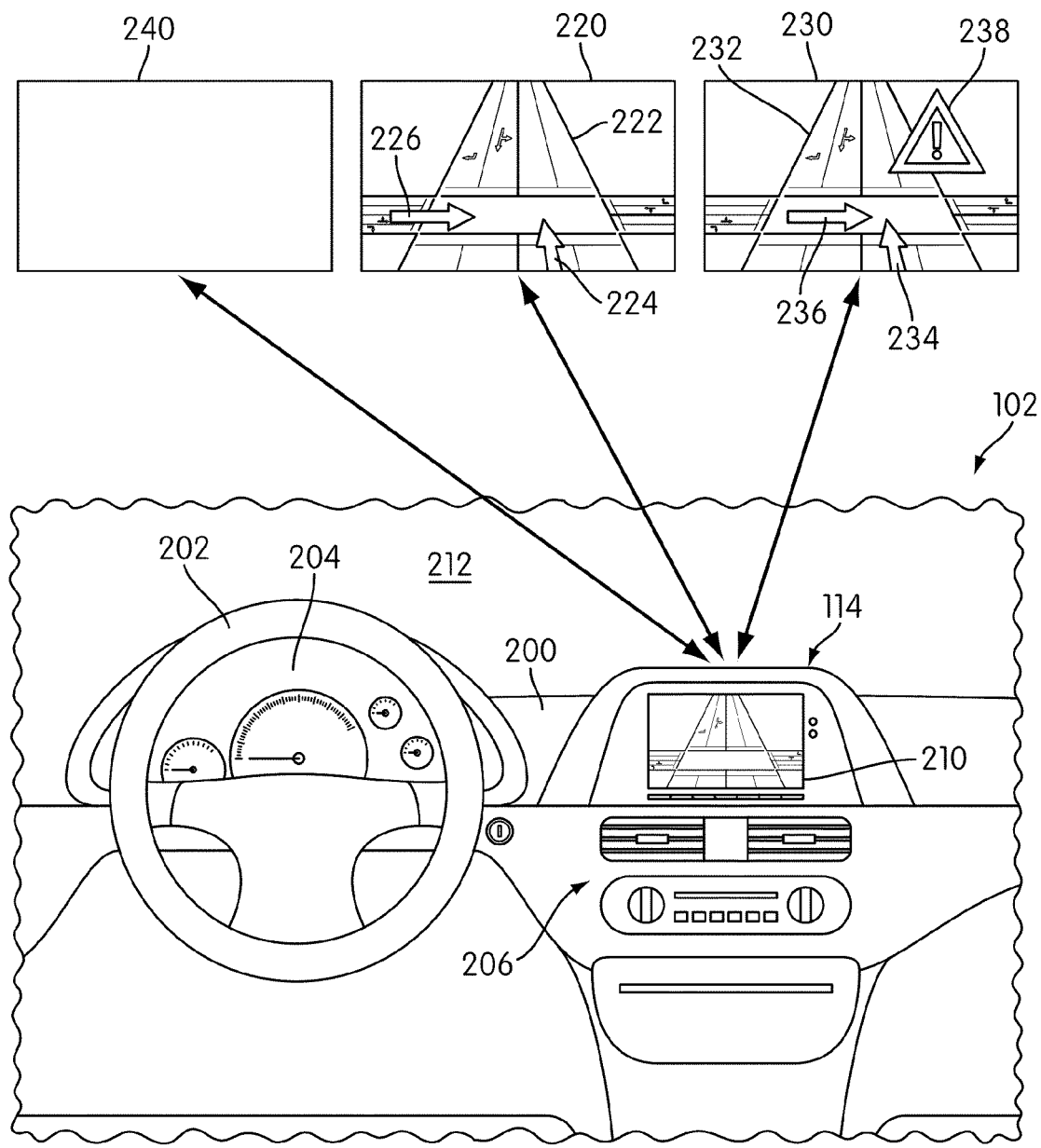
FIG. 2 is a schematic view of alert images for a collision warning system.

FIG. 2 illustrates an example dashboard 200 for subject vehicle 102. Dashboard 200 can include steering wheel 202 and instrument panel 204. In some embodiments, dashboard 200 can further include center portion 206. In some cases, center portion 206 can include one or more devices associated with an interior of a motor vehicle. Examples include, but are not limited to: audio devices, video devices, navigation devices, as well as any other types of devices. In addition, center portion 206 can be associated with controls for one or more systems of subject vehicle 102 including, but not limited to: climate control systems and other types of systems.

A motor vehicle can include provisions for displaying information from a collision warning system. In some embodiments, a motor vehicle can include a display device of some kind. In some cases, a motor vehicle can include a video screen for displaying information from a collision warning system. Examples of display devices include, but are not limited to: LCDs, CRTs, ELDs, LEDs, OLEDs, as well as other types of displays. In other cases, a display device can be a projection type display device that is configured to project an image onto one or more surfaces of subject vehicle 102. It will be understood that a display device can not be limited to a video screen or projection type display device.

In one embodiment, subject vehicle 102 can include display device 210. In some cases, display device 210 can be associated with driver vehicle interface 114 of collision warning system 100. In particular, display device 210 can be configured to present visual information received from collision warning system 100. In an exemplary embodiment, display device 210 can be an LCD screen.

In some embodiments, display device 210 can be disposed within center portion 206. However, it will be understood that in other embodiments, display device 210 can be located in any portion of subject vehicle 102 as long as display device 210 can be viewed by a driver. For example, in another embodiment, display device 210 can be a projection type device that displays an image onto front window 212. In addition, while display device 210 can be configured to present visual information received from collision warning system 100, display device 210 can be shared with other devices or systems within motor vehicle 100. For example, display device 210 can also be used as a screen for a navigation system.

It will be understood that in some embodiments, a driver vehicle interface can include additional provisions beyond a display screen. For example, in another embodiment, a driver vehicle interface can also be associated with one or more input devices that allow a driver to control various aspects of a collision warning system. In some cases, a driver vehicle interface can include an on/off button for turning a collision warning system on and off. In still another embodiment, a driver vehicle interface can be associated with speakers for generating auditory information.

A display device for a collision warning system can be configured to display one or more images associated with various types of alerts of the collision warning system. For purposes of clarity, the following detailed description discusses a collision warning system utilizing two distinct alert types: informing alerts and warning alerts. In particular, informing alerts are used to inform a driver of nearby vehicles or objects that can pose potential problems at a later time. In contrast, a warning alert can be issued to warn the driver of a serious threat of collision with a nearby vehicle or object. In other words, informing alerts inform a driver of low level collision threats, while warning alerts inform a driver of high level collision threats. In other embodiments, any other number of alert types can be used. In some cases, three or more alert types can be issued by a collision warning system.

In the exemplary embodiment, collision warning system 100 includes informing alert image 220 that is associated with an informational alert. Informing alert image 220 can comprise one or more symbols or icons. In this embodiment, informing alert image 220 includes intersection symbol 222, which indicates an intersection of an upcoming road section. In addition, informing alert image 220 includes first arrow 224 and second arrow 226, representing the general location and heading of subject vehicle 102 and an approaching vehicle for which there can some threat of collision. By displaying informing alert image 220, a driver is alerted to a potential collision threat with an approaching vehicle. This information can help a driver to be more aware as subject vehicle 102 approaches the upcoming intersection.

In the exemplary embodiment, collision warning system 100 also includes warning alert image 230 that is associated with a warning alert. Warning alert image 230 can comprise one or more symbols or icons. In a similar manner to informing alert image 220, warning alert image 230 can include intersection symbol 232, first arrow 234 and second arrow 236. These symbols indicate information about an upcoming intersection as well as the speeds and headings of subject vehicle 102 and an approaching vehicle. In addition, warning alert image 230 includes warning symbol 238. The appearance of warning symbol 238 alerts a driver to an immediate threat posed by an approaching vehicle. This information can help a driver to avoid a collision by taking immediate action.

In addition to the two types of alerts discussed above, a display device can be configured to display no image when no alert has been issued by collision warning system 100. In this embodiment, display device 210 displays default screen 240 when no alert is issued. In the exemplary embodiment, default screen 240 is associated with a blank screen of display device 210. However, in embodiments where display device 210 is used for displaying information from other systems, default screen 240 can not be a blank screen. For example, in embodiments where display device 210 is shared between a navigational system and collision warning system 100, display device 210 can continue to display images received from the navigation system until an alert is issued. Likewise, once an alert has expired, display device 240 can return to displaying images from a navigation system.

Although a single image is shown for each type of alert (informing alerts and warning alerts) in the current embodiment, other embodiments can include more than one image for each type of alert. In particular, an arrow used to indicate position and heading of a vehicle can be changed from a straight arrow indicating the intention of a vehicle to pass straight through an intersection to curved arrows in cases where the intention of the vehicle is to turn at the intersection. This arrangement can help to inform a driver as to the intentions of an approaching vehicle. In addition, a three way intersection symbol can be used in place of a four way intersection symbol in cases where the upcoming intersection is a three way intersection. However, in embodiments using multiple images for each type of alert, it will be understood that some distinguishing elements can be used to indicate that an alert is an informing alert or a warning alert. For example, as in the current embodiment, a warning symbol can be used to distinguish between informing alerts and warning alerts. Likewise, in some cases, informing alerts can be associated with a different color than warning alerts. In one embodiment, informing alerts can include symbols or icons colored in yellow, while warning alerts can include symbols or icons colored in red.

FIGS. 3 through 6 illustrate an example collision warning system in use. As previously discussed, subject vehicle 102 includes collision warning system 100. In particular, subject vehicle 102 includes provisions for communicating with one or more vehicles using a vehicle communication network. Also, subject vehicle 102 includes provisions for alerting a driver of potential collisions using either informing alerts or warning alerts.

Figure 3:
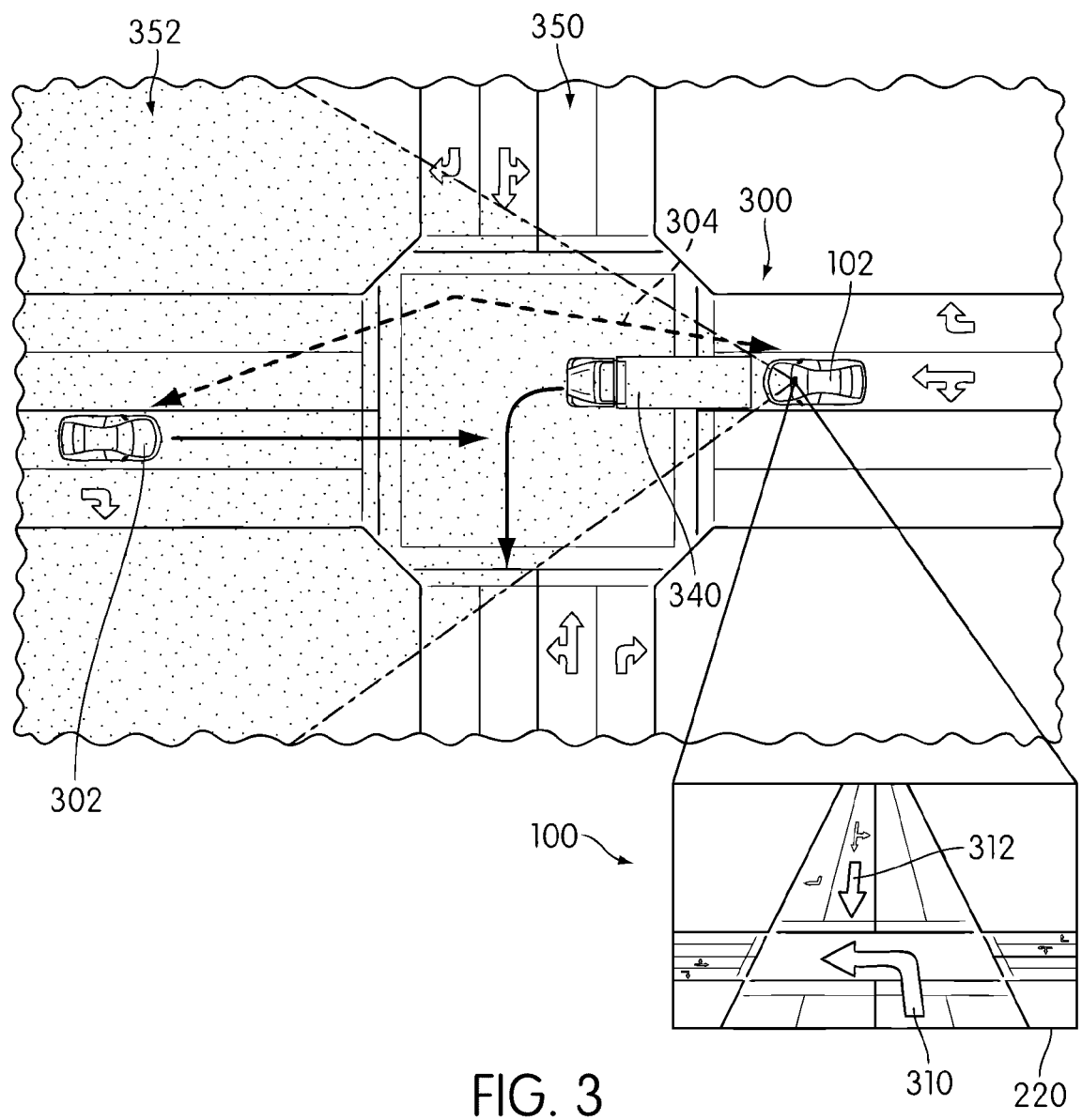
FIG. 3 is a schematic view of a collision warning system displaying an informing alert image.

Referring to FIG. 3, subject vehicle 102 is in communication with target vehicle 302 using vehicle communication network 304. The term "target vehicle" as used throughout this detailed description and in the claims generally refers to any vehicle about which a collision warning system can issue an alert. Furthermore, for clarity, a vehicle possessing a collision warning system can be referred to as a "subject vehicle", in contrast to the target vehicle. In particular, subject vehicle 102 is the subject vehicle in this embodiment.

In some cases, vehicle communication network 304 can be a DSRC network, as discussed above. In particular, using vehicle communication network 304, subject vehicle 102 and target vehicle 302 can be configured to exchange various types of information including, but not limited to: vehicle position, vehicle speed, vehicle trajectory as well as other types of vehicle information. In addition, any type of basic safety message (BSM) can be exchanged via vehicle communication network 304.

In the present example, each vehicle operating on vehicle communication network 304 is presumed to have a GPS antenna to determine vehicle locations. Using vehicle location information, velocities and headings for each vehicle can also be computed. In some cases, target vehicle 302 can simply transmit a current GPS position and subject vehicle 102 can calculate speed and heading according to the current GPS position. In other cases, target vehicle 302 can transmit each of these values independently.

In the present example, after receiving attributes from target vehicle 302, collision warning system 100 can determine if an alert should be issued. Since subject vehicle 102 is planning to make a left turn at intersection 300 and target vehicle 302 is planning to pass straight through intersection 300, there is potentially a threat of collision. In this case, collision warning system 100 can issue an informing alert using informing alert image 220. Informing alert image 220 can include first arrow 310 and second arrow 312, indicating the planned trajectories of subject vehicle 102 and target vehicle 302, respectively. By displaying informing alert image 220, collision warning system 100 can inform a driver of subject vehicle 102 to a potential threat posed by target vehicle 302.

Figure 4:
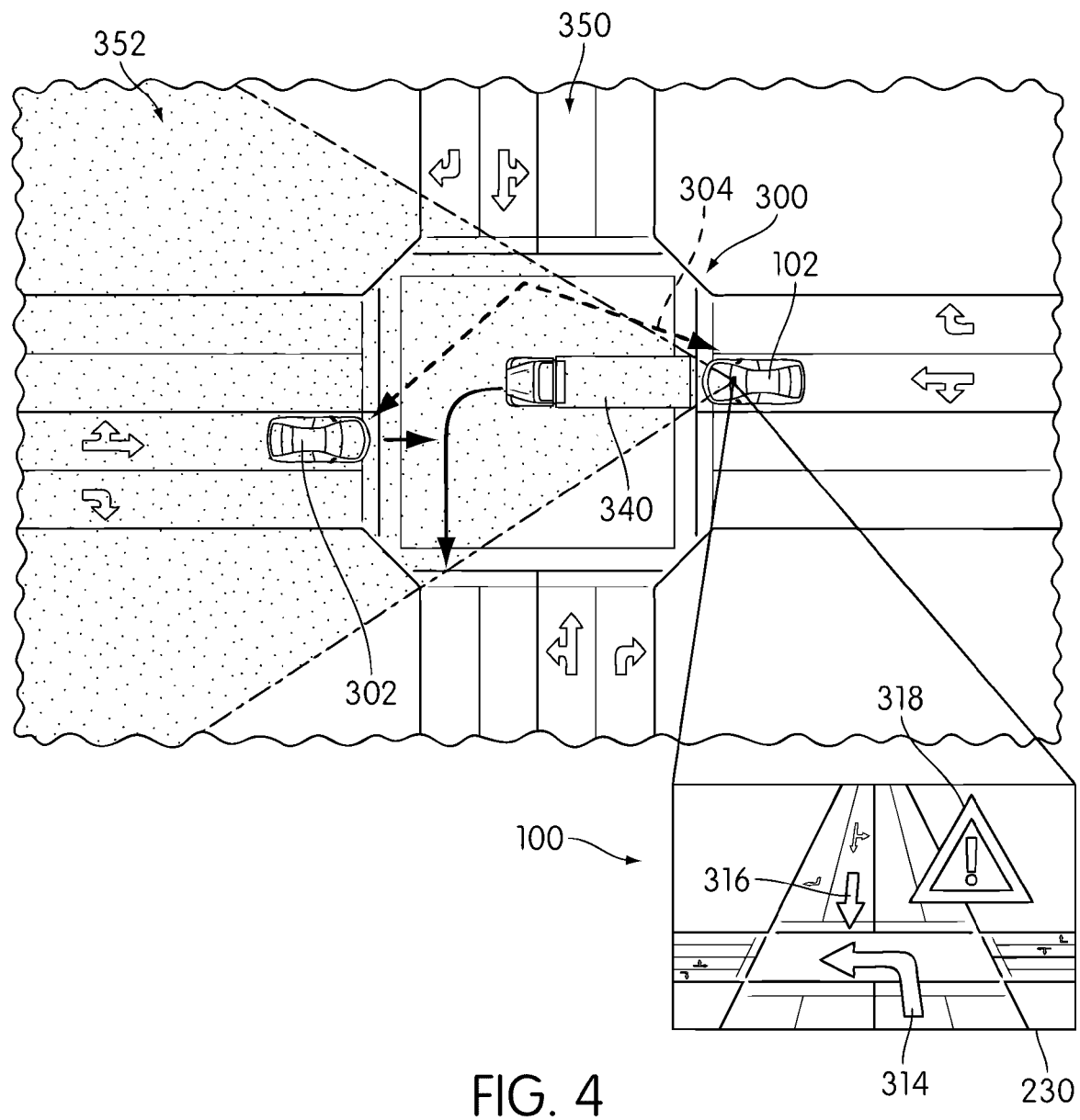
FIG. 4 is a schematic view of a collision warning system displaying a warning alert image.

Referring to FIG. 4, at a later time, target vehicle 302 is shown as it is just about to enter intersection 300. At this point, collision warning system 100 can determine that the threat of collision is very high. In this case, collision warning system 100 can issue a warning alert using warning alert image 230. Warning alert image 230 can include first arrow 314 and second arrow 316, indicating the planned trajectories of subject vehicle 102 and target vehicle 302, respectively. In contrast to the informing alert image illustrated in FIG. 3, warning alert image 230 also includes warning symbol 318, which indicates a serious threat of collision. By displaying warning alert image 230, collision warning system 100 can warn the driver of subject vehicle 102 to a serious collision threat posed by target vehicle 302. This warning can allow the driver to alter the current planned trajectory in order to avoid a collision.

In some cases, a driver can feel that a collision warning system issues too many alerts, especially informing alerts which can inform the driver about situations already known to the driver. For example, in situations where a driver has good line of sight of a target vehicle, an informing alert displaying the location and trajectory of the target vehicle can be seen as a nuisance. Some drivers can choose to deactivate a collision warning system rather than put up with these "nuisance alerts."

A collision warning system can include provisions for reducing the number of alerts issued to a driver. In some embodiments, a collision warning system can be configured to prevent informing alerts from being issued when a driver has good line of sight to a target vehicle. In some cases, a collision warning system can be configured to operate in two or more alert modes. A first alert mode can be used when the driver has good line of sight of a target vehicle. A second alert mode can be used when the driver does not have line of sight of a target vehicle. In an exemplary embodiment, the first alert mode can be referred to as a normal alert mode. The second alert mode can be referred to as an enhanced alert mode. Furthermore, during the normal alert mode, a collision warning system can issue less warnings since a driver can see the target vehicle clearly. In contrast, the enhanced alert mode can be associated with a higher frequency of issued alerts, since the driver cannot see the target vehicle, and thus can benefit from additional information to avoid potential collisions.

Referring to FIGS. 3 and 4, subject vehicle 102 is shown situated behind truck 340. Because of this arrangement, the line of sight from within subject vehicle 102 has been reduced. For purposes of illustration, intersection 300 and the surrounding area have been divided into visible region 350 and non-visible region 352. In other words, from within subject vehicle 102 a driver is able to see everything located within visible region 350, but the driver is unable to see objects located within non-visible region 352, due to the presence of truck 340 in front of subject vehicle 102. Since target vehicle 302 is within non-visible region 352, a driver inside of subject vehicle 102 cannot see target vehicle 302. In addition, a direct communication path between subject vehicle 102 and target vehicle 302 is obstructed by truck 240. However, by using the reflection wave path or the diffraction wave path of a communication signal, vehicle communication network 304 can still be established. In this situation, collision warning system 100 can be operated in the enhanced alert mode. In particular, as discussed above, displaying informing alert image 220 gives a driver useful information about target vehicle 302 that is not considered a nuisance. In a similar manner, as target vehicle 302 gets closer to intersection 300, collision warning system 100 can issue warning alert image 230. In this situation, a driver can not be aware of an impending collision since target vehicle 302 is located within non-visible region 352 and is not in the line of sight of the driver.

Figure 5:
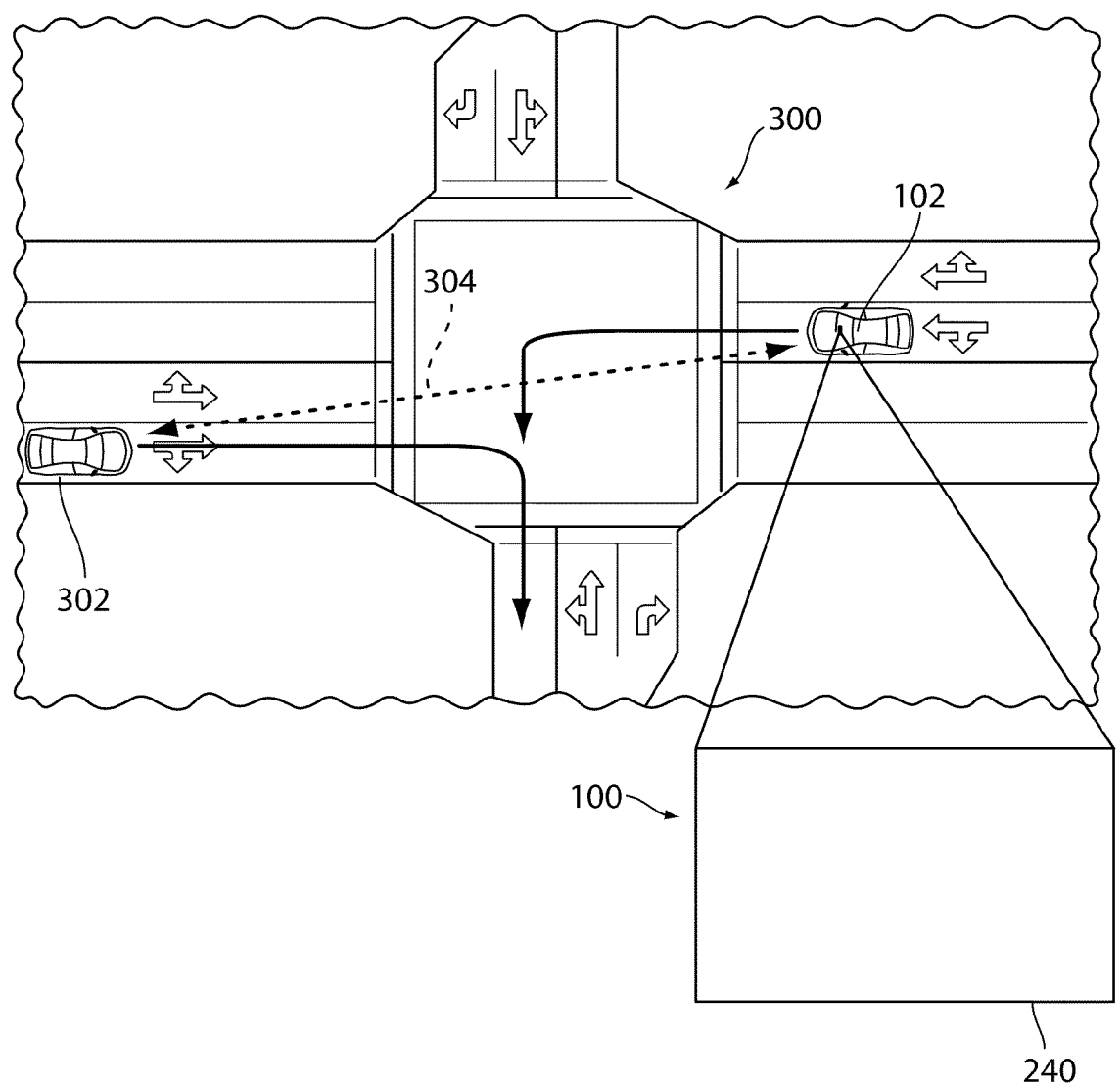
FIG. 5 is a schematic view of a collision warning system displaying a default screen.

In contrast, FIG. 5 illustrates collision warning system 100 operating in a normal alert mode. In this case, the line of sight of subject vehicle 102 is not obstructed. Also, in this case, vehicle communication network 304 is established using a direct wave path. In particular, a driver within subject vehicle 102 can see target vehicle 302. In this situation, collision warning system 100 can determine that the driver has good line of sight of target vehicle 302 and therefore no informing alert is necessary. In the exemplary embodiment, default image 240 is shown on a display screen associated with collision warning system.

Figure 6:
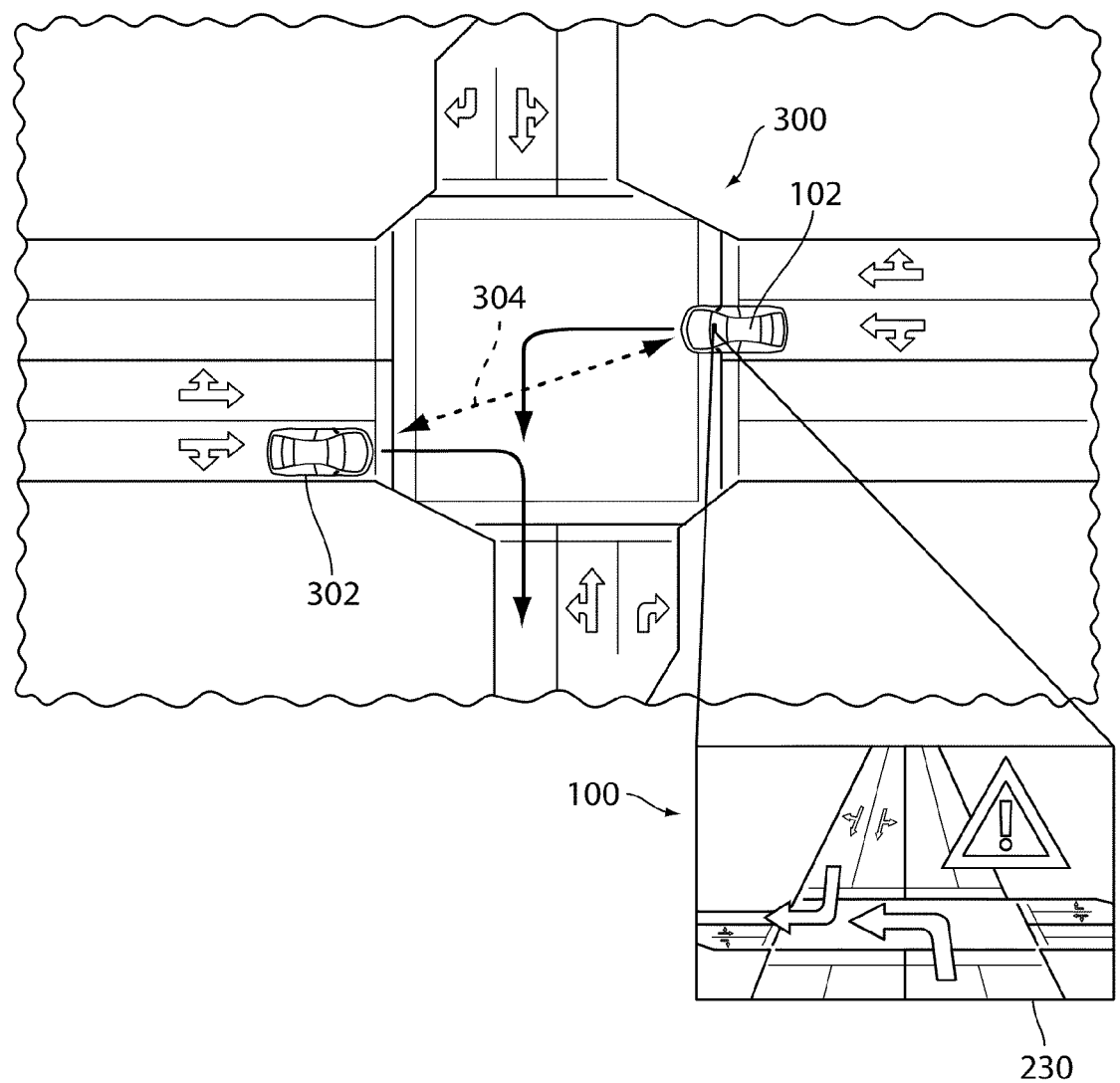
FIG. 6 is a schematic view of a collision warning system displaying a warning alert image.

As seen in FIG. 6, as target vehicle 302 enters intersection 300, collision warning system can determine that the threat of a collision is very high. Therefore, at this point, collision warning system 100 can issue warning alert image 230 even though the driver has good line of sight of target vehicle 302.

With the arrangement discussed here, the number of alerts issued by a collision warning system can be modified according to the line of sight conditions. In particular, during normal alert mode, the collision warning system only issues warning alerts. In other words, the collision warning system only issues alerts when the threat of collision is high. In contrast, during the enhanced alert mode, the collision warning system can issue both informing alerts and warning alerts. This arrangement can help prevent deactivation of a collision warning system from annoyed drivers.

As discussed above, communications between two vehicles can be established using direct paths as well as reflection wave paths or diffraction wave paths. In particular, direct paths for signals associated with a vehicle communication network can be used when two vehicles have line of sight of one another. In addition, reflection wave paths or diffraction wave paths for signals associated with a vehicle communication network can be used when there is not good line of sight between vehicles, since a direct path can be obstructed by one or more objects in such cases. With this arrangement, a vehicle communication network can be established during both good line of sight conditions and non-line of sight conditions.

In some cases, the threat of collision can be associated with two or more discrete threat levels. In some cases, the threat of collision can be associated with "no threat," "low threat" or "high threat" levels. In other cases, the threat of collision can be associated with additional threat levels. In other embodiments, the threat of collision can be associated with a continuous value. For example, the threat of collision can be a value between 0 and 100, with 0 being no threat and 100 being the highest threat level. For purposes of clarity, the following detailed descriptions discusses embodiments utilizing the three discrete threat levels discussed above.

Figure 7A:
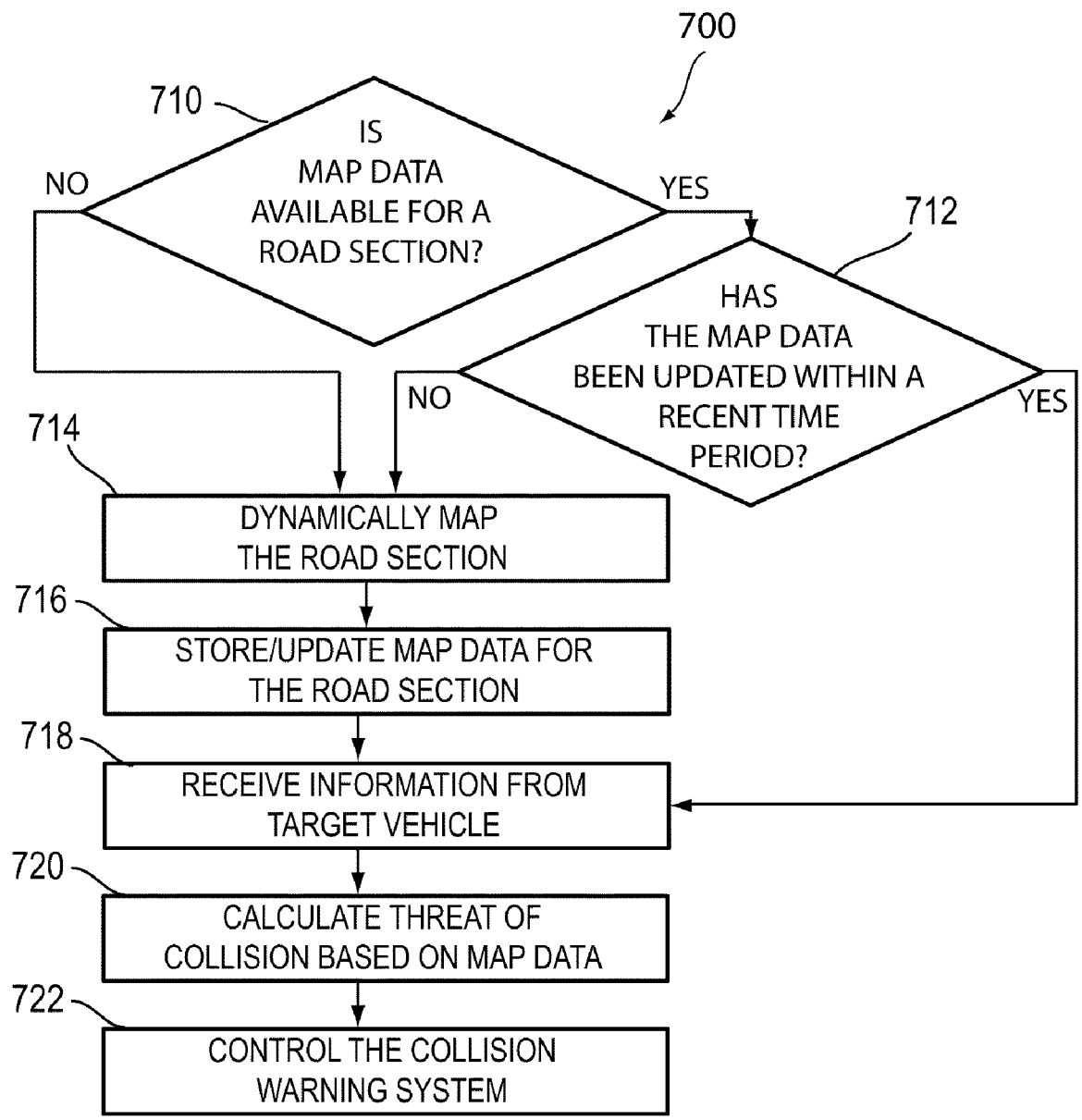
FIGS. 7A to 7C illustrate processes pertaining to dynamically mapping a road section.
Figure 7B:
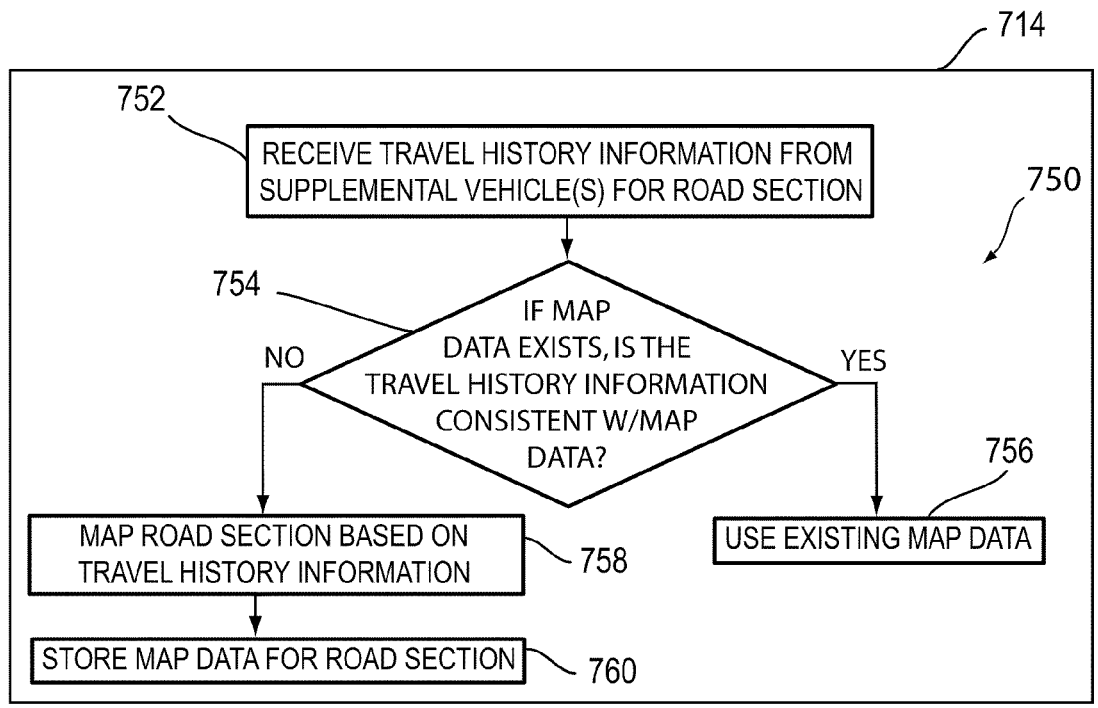

In some cases, map data including detail road configuration information may be unavailable, which can reduce the effectiveness collision warning system 100. FIGS. 7A and 7B illustrate processes pertaining to dynamically mapping a road section, such as an upcoming intersection, for use with the collision warning system. These processes can provide advantages in various circumstances including when map data does not exist for an upcoming road section or when existing map data is stale or appears to be inconsistent with information about the subject vehicle or other vehicles in communication with the subject vehicle.

For instance, with respect to the example of an upcoming intersection, conventional technology relies on stored maps or off-board maps to provide the possibility of intersection topology identification. The availability of intersection information may not be readily available or complete including data provided by mapping systems, such as map data provided from a central repository. Further, even if the vehicle's map database contains intersection information that is initially accurate, over time it can become obsolete. For vehicle safety systems that attempt to monitor potential hazard situations at intersections, such as determining whether a vehicle is turning in front of another vehicle, it can be very beneficial to have accurate and up-to-date information about the intersection topology and road configuration.

As illustrated in FIGS. 7A and 7B, vehicles that have the ability to communicate vehicle information with other vehicles can map an upcoming road section based in part on information from other vehicles—even if the subject vehicle lacks map data for the upcoming road section. For example, through the use of GPS location and general map matching, subject vehicle 102 can determine if it is approaching an intersection or another significant road section while lacking detailed information about the road section. In the example of an intersection of roads, the subject vehicle can monitor cross traffic vehicles as to their positions and direction of travel and build a path history that describes the cross traffic lanes being used by the other vehicles. Using this information the subject vehicle can monitor vehicles approaching the intersection and via the use of the path history calculate which lane the crossing vehicle is in and estimate whether this is the same lane that would be used by the subject vehicle if it were to make a right turn. This can allow the collision warning system to judge the relative safety of making a turn with cross traffic vehicles approaching the intersection even without having preexisting map data for the road section.

Referring specifically to FIG. 7A, a process 700 is shown for operating a collision warning system with respect to map data for an upcoming road section. In this example, the following steps can be performed by ECU 120; however in some cases these steps can be performed by additional systems or devices associated with subject vehicle 102 and/or collision warning system 100. In addition, it will be understood that one or more of the following steps can be optional.

During step 710, ECU 120 can determine whether map data is available for an upcoming road section, such as an intersection of roads. In some cases, ECU can determine whether map data for the road section is included with map data 118 stored in storage medium 116. ECU 120 can also determine whether the road section map data is available from other sources, such as a map service, a roadside transmitter associated with the road section, or from other vehicles via a vehicle communication network, such as a DSRC network. If so, during step 712, ECU 120 can consider whether the map data has been updated within a recent time period.

In some embodiments, the recent time period can be a preset period of relatively short duration to allow for updates in minor changes to the road configuration to be represented by the map data, such as during construction modifications. For instance, it can be several hours or less for map data expected to have frequent updates, such as map data received from a roadside transmitter or from a map service, or longer periods such as one or two days or a week. Further, the recent time period can be a preset period of longer duration, such as one or two weeks, one month, two months, three months or six months or more, and even one year or more for road sections that rarely change. If map data for the road section has not been updated within a recent time period, during step 714, ECU 120 can dynamically map the road section as discussed further below. During step 716, ECU 120 can store the new map data for the road section, or update existing map data for the road section, based on the dynamic mapping performed in step 714.

Following step 716, ECU 120 can proceed to step 718 and receive information from a target vehicle via a vehicle communication network, such as a DSRC network. During step 720, ECU 120 can calculate the threat of collision based on vehicle information and map data for the road section. The map data for the road section can include detailed road information such as lane information (e.g., number of lanes, lane configuration, lane types), path limitations (e.g., one-way street limitations), turn restrictions, path elevations and grades, physical barriers like gates, indications of restricted access, scheduled construction, etc. ECU 120 can calculate the threat of collision by performing actions including evaluating vehicle information in comparison with map data for the road section. For example, ECU 120 can evaluate information for the target vehicle and the subject vehicle, such as vehicle position, vehicle speed, vehicle trajectory and other types of vehicle information, and compare it with the map data for the road section to determine the threat of collision between the subject vehicle and target vehicle. During step 722, ECU 120 can control the collision warning system. In some cases, ECU 120 can use the threat of a collision based on the map data to determine whether to issue an alert as well as to determine what type of alert to issue.

FIG. 7B illustrates a process for dynamically mapping a road section, which can correspond with step 714 of method 700 shown in FIG. 7A. In step 752, ECU 120 can receive travel history information from one or more supplemental vehicles for the upcoming road section, such as an intersection. In one embodiment, a supplemental vehicle can include another vehicle that has recently traversed the road section, such as a vehicle traversing part of the road section or exiting an intersection. In another embodiment, a supplemental vehicle can include a vehicle that has previously traversed the road section within a close time period, which can be a relatively short predetermined time period, such as several minutes, hours or days in order to consider its travel history information to be current. The predetermined time period for considering travel history information to be current can be less than the recent time period noted in step 712 of method 700 (FIG. 7A) for considering a map update to be current. However, it could be of similar duration of longer.

In step 754, if map data exists for the road section, the ECU 120 can evaluate whether the travel history information for the road section received from the one or more supplemental vehicles is consistent with the preexisting map data for the road section. If so, in step 756, ECU 120 can choose to rely on the existing map data for calculating a threat of collision for the road section. If the travel history information is inconsistent with existing map data, in step 758, ECU 120 can proceed with dynamically mapping road section based on the travel history information. Alternatively, ECU 120 can simply choose to update the existing map data based on dynamically mapping the road section. Further, ECU 120 can also compare the close time period from which the corresponding supplemental vehicle traversed the road section with the recent time period of a map data update for step 712 and verify that the travel history information received is more recent than the updated map data. In step 760, ECU 120 can store the map data for the road section determined from the travel history information, which can include updating existing map data.

Figure 7C:
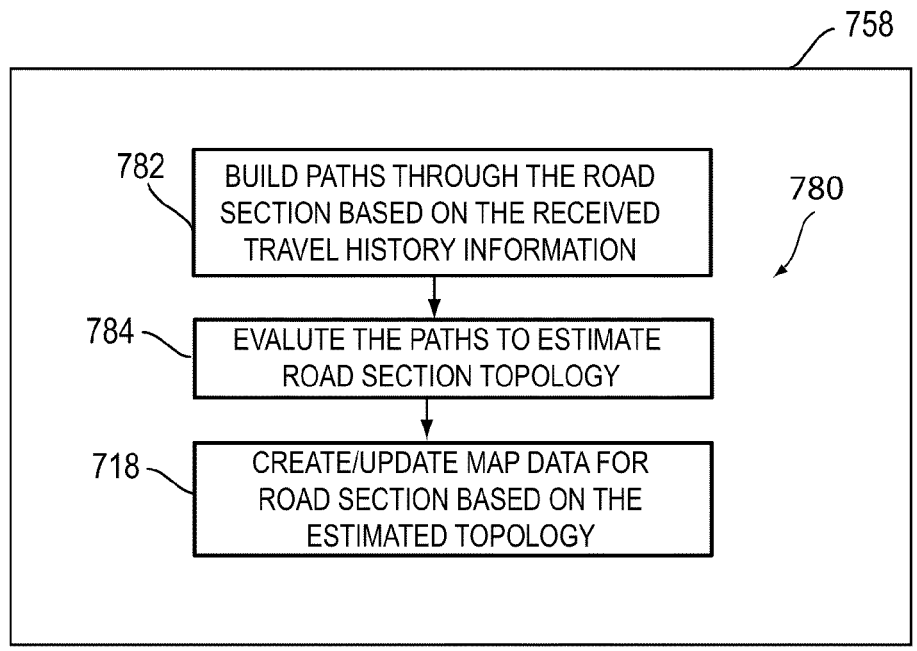

FIG. 7C illustrates a process 780 for dynamically estimating road section map data, which can correspond with step 758 of FIG. 7B. ECU 120 can use process 780 to estimate road section map data through the use of location monitoring and map matching of subject vehicle 102 via its GPS-based navigation system (not shown) that includes GPS receiver 110. In step 782, ECU 120 and/or the navigation system can use the location and map matching information to determine if subject vehicle 102 is approaching an intersection or other significant road section. In step 784, ECU 120 can evaluate travel history information received from supplemental vehicles, such as cross traffic vehicles that are traveling through or have recently traveled through the intersection, including evaluating their positions and direction of travel through it. In step 786, ECU 120 can build a path history through the road section based on its evaluation of travel history information and proceed to estimate the topology and configuration of the intersection.

Thereafter, ECU 120 can perform step 760 to store the path history information as map data for the road section and step 720 to calculate the threat of collision based on the map data. Thus, subject vehicle 102 can monitor vehicles approaching the intersection and better calculate the threat of collision with those vehicles based on the map data it determined. In some cases involving an intersection, ECU 120 can determining which lane the crossing vehicle is in based on the map data and estimate whether this is the same lane that would be used by the subject vehicle if it were to make a right turn.

Figure 8:
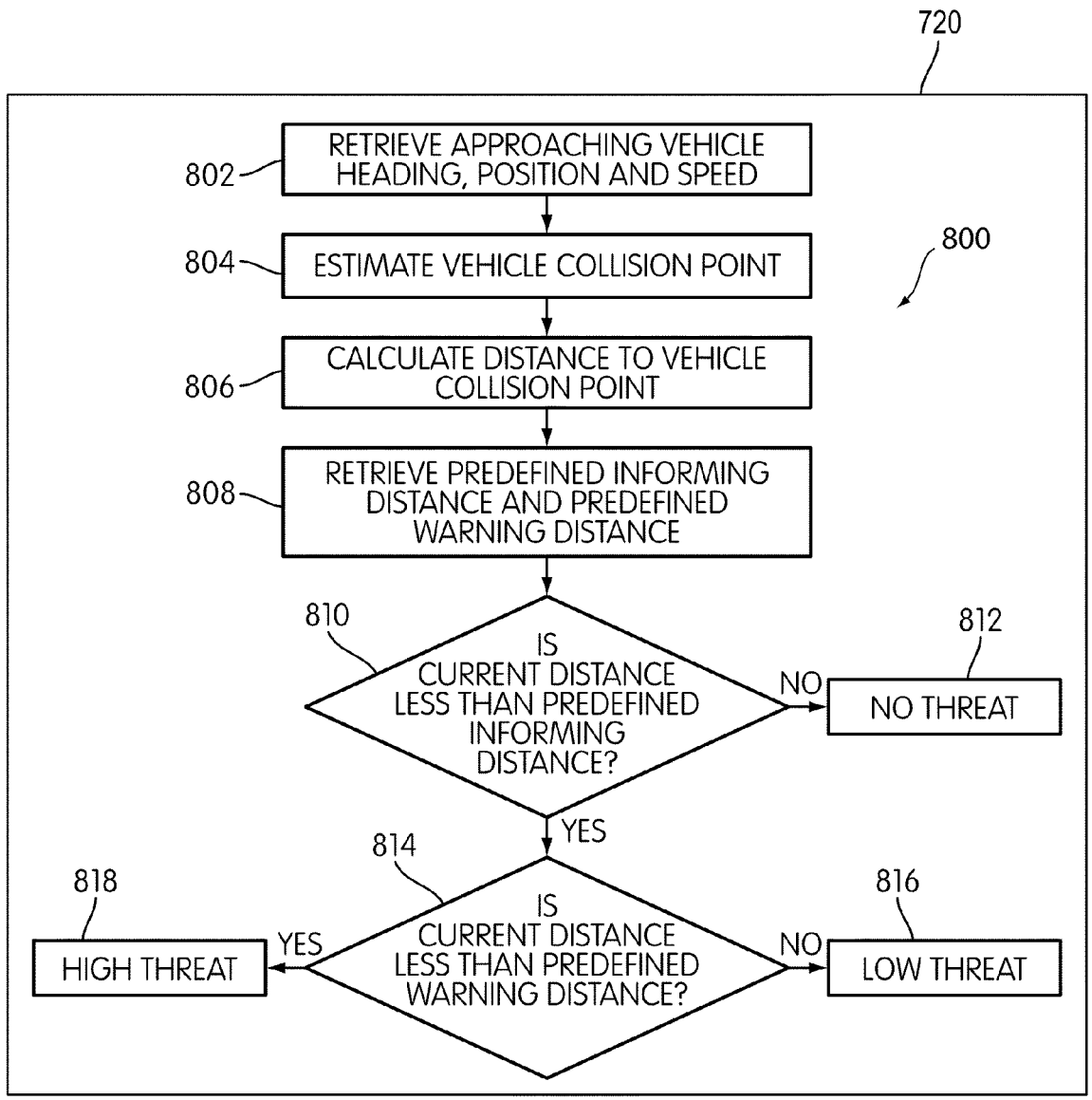
FIGS. 8 and 9 illustrate processes pertaining to controlling a collision warning system.

FIG. 8 illustrates an embodiment of a process for calculating the threat of collision based on map data, such as map data it prepares according to methods 700, 750 and 780. In this example, the following steps can be performed by ECU 120; however in some embodiments these steps can be performed by additional systems or devices associated with subject vehicle 102 and/or collision warning system 100. In addition, it will be understood that in other embodiments one or more of the following steps can be optional.

During step 802 of method 800, ECU 120 can retrieve the heading, position and speed of a target vehicle relative to map data for the road section using the vehicle communication network. Next, during step 804, ECU 120 can estimate a vehicle collision point based on map data for the road section and the vehicle information for the subject vehicle, as well as the vehicle information for the target vehicle. The term "vehicle collision point" refers to a point at which the subject vehicle and the target vehicle would likely collide given current headings, positions and speeds for both vehicles with respect to the map data. In addition, ECU 120 can use other available information for estimating a vehicle collision point, such as the intention of one or both drivers to turn at an upcoming intersection.

Following step 804, ECU 120 can proceed to step 806 and calculate the distance to the vehicle collision point. At this point, ECU 120 can proceed to step 808 and retrieve a predefined informing distance and a predefined warning distance. The predefined informing distance can be a distance from the vehicle collision point within which the collision warning system can determine that there is a low threat of collision. Likewise, the predefined warning distance can be a distance from the vehicle collision point within which the collision warning system can determine that there is a high threat of collision.

Following step 808, ECU 120 can proceed to step 810 and determine if the current distance to the vehicle collision point is less than the predefined informing distance. If ECU 120 determines that the current distance to the vehicle collision point is not less than the predefined informing distance, ECU 120 can proceed to step 812, in which ECU 120 can determine that there is no threat. Otherwise, ECU 120 can proceed to step 814 and determine if the current distance to the vehicle collision point is less than the predefined warning distance. If ECU 120 determines that the current distance to the vehicle collision point is not less than the predefined warning distance, ECU 120 can proceed to step 816 and determine that there is a low threat level. If, during step 814, ECU 120 determines that the current distance to the vehicle collision point is less than the predefined warning distance, ECU 120 can proceed to step 818 and determine that there is a high threat level.

It will be understood that the current embodiment of a process for determining a threat of collision is only intended to be exemplary. Generally, any appropriate method of determining a threat level according to information related to a subject vehicle and a target vehicle can be used. In other embodiments, a collision warning system can use another process for determining a threat of collision. For example, in another embodiment, rather than calculating a distance to the vehicle collision point, a time to vehicle collision point can be calculated and compared with a predefined informing alert time as well as a predefined warning alert time.

Figure 9:
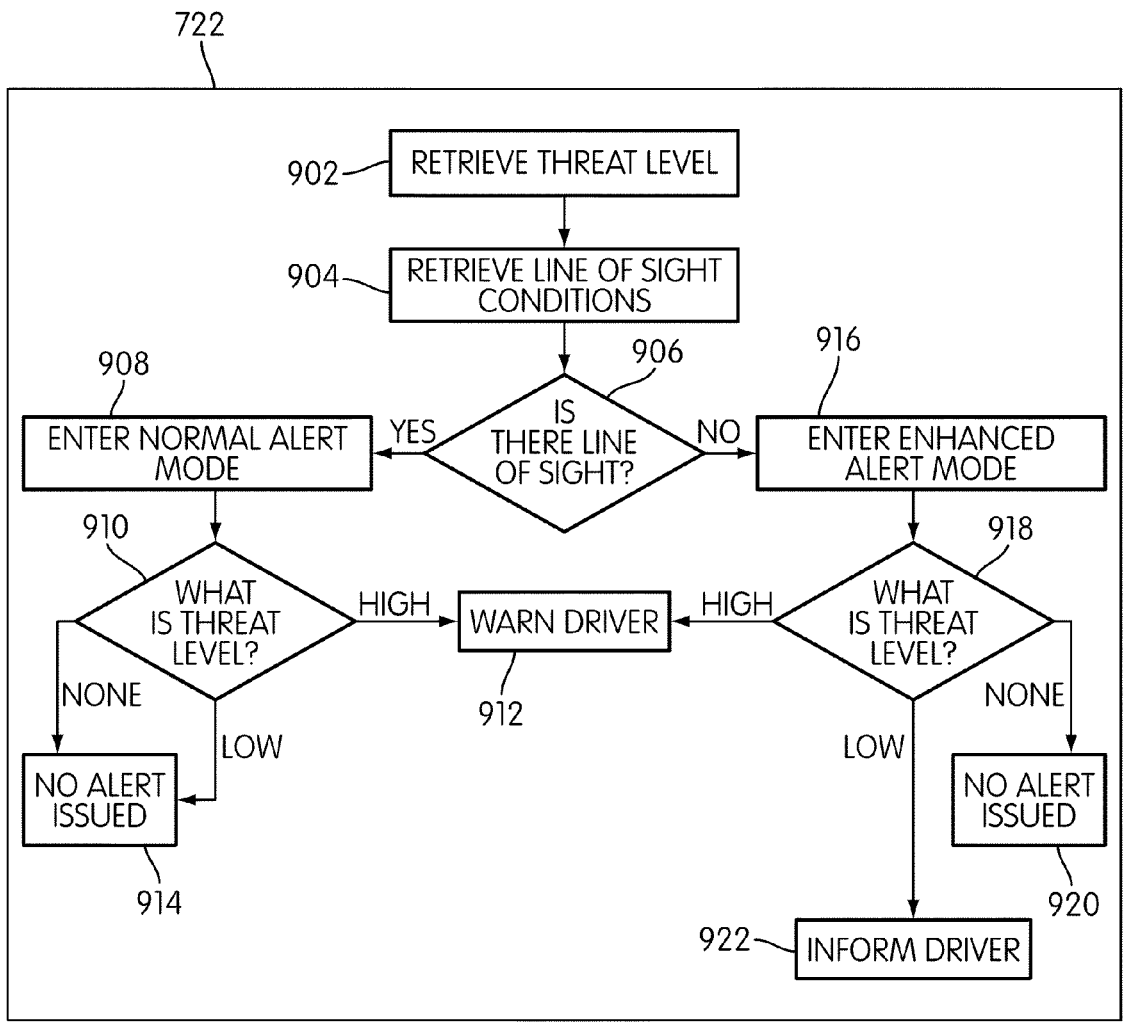

FIG. 9 illustrates a process for operating collision warning system 100. In this example, the following steps can be performed by ECU 120; however in some embodiments these steps can be performed by additional systems or devices associated with subject vehicle 102 and/or collision warning system 100. In addition, it will be understood that in other embodiments one or more of the following steps can be optional.

During step 902, ECU 120 can receive the threat level. In some cases, the threat level can be calculated using the method discussed above with method 800. Next, ECU 120 can receive the line of sight conditions during step 904. In particular, ECU 120 can determine if a target vehicle is within the line of sight of a driver.

Following step 904, ECU 120 can proceed to step 906 and determine if there is line of sight according to the line of sight conditions received during step 904. If there is line of sight, ECU 120 can proceed to step 908 and put collision warning system 100 in a normal alert mode. Following step 908, ECU 120 can proceed to step 910 and determine the threat level according to the threat level received during step 902. If, during step 910, ECU 120 determines that the threat level is high, ECU 120 can proceed to step 912, where a warning alert is issued. Otherwise, if ECU 120 determines that the threat level is low or that there is no threat, ECU 120 can proceed to step 914 and no alert would be issued.

Returning to step 906, if ECU 120 determines that there is no line of sight, ECU 120 can proceed to step 916 and put collision warning system 100 in an enhanced alert mode. In particular, the enhanced alert mode can be a mode of collision warning system 100 associated with a high frequency of informing alerts due to the inability of the driver to see the target vehicle.

Following step 916, ECU 120 can proceed to step 918 and determine the threat level according to the threat level received during step 902. If, during step 918, ECU 120 determines that there is no threat, ECU 120 can proceed to step 920, where no alert would be issued. If, during step 920, ECU 120 determines that there is a low threat, ECU 120 can proceed to step 922, where an informing alert can be issued. If, during step 920, ECU 120 determines that the threat level is high, ECU 120 can proceed to step 912, where a warning alert can be issued.

Figure 10:
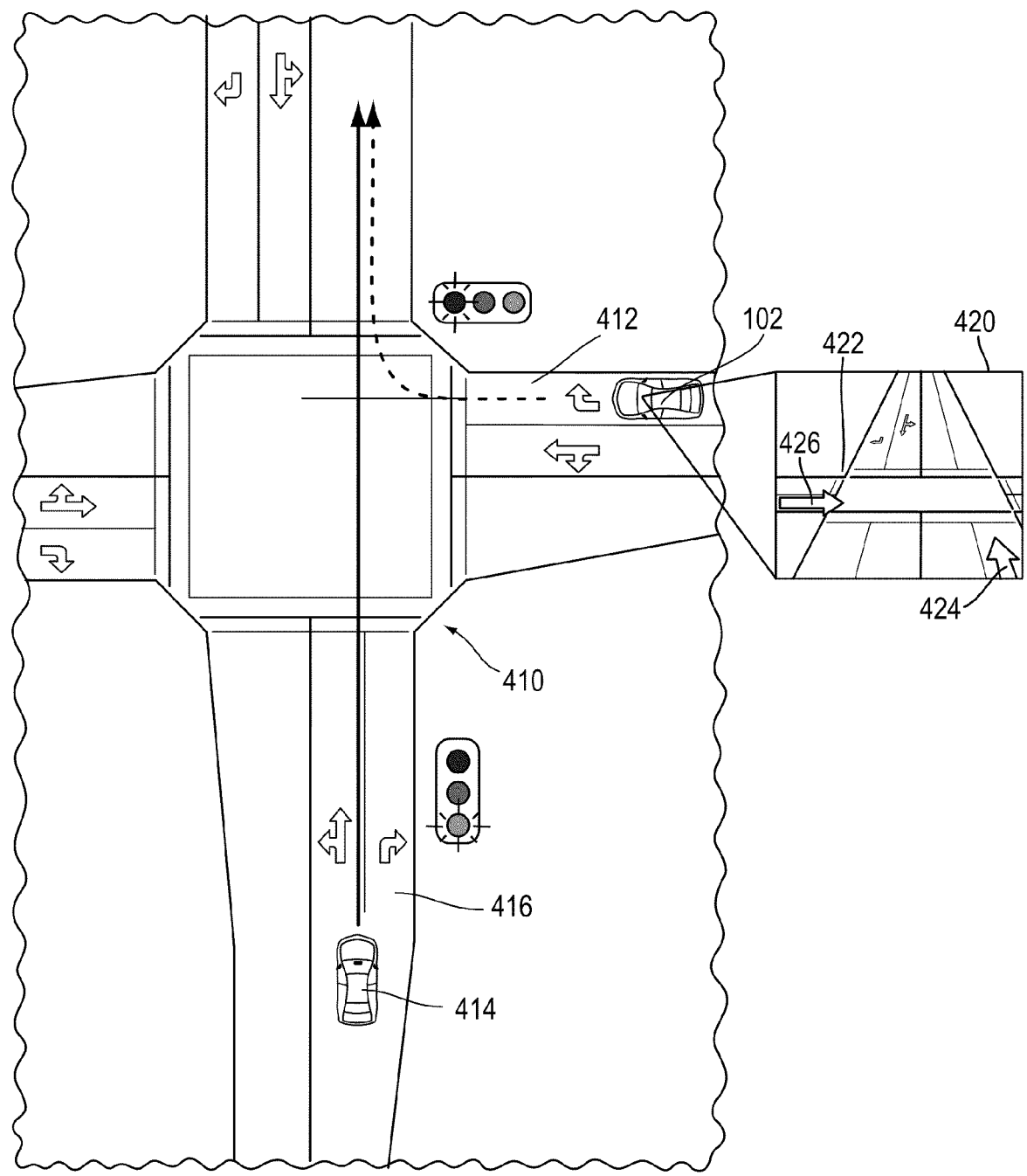
FIGS. 10 and 11 are schematic views of a configuration of a subject vehicle and a target vehicle approaching an unmapped intersection.
Figure 11:
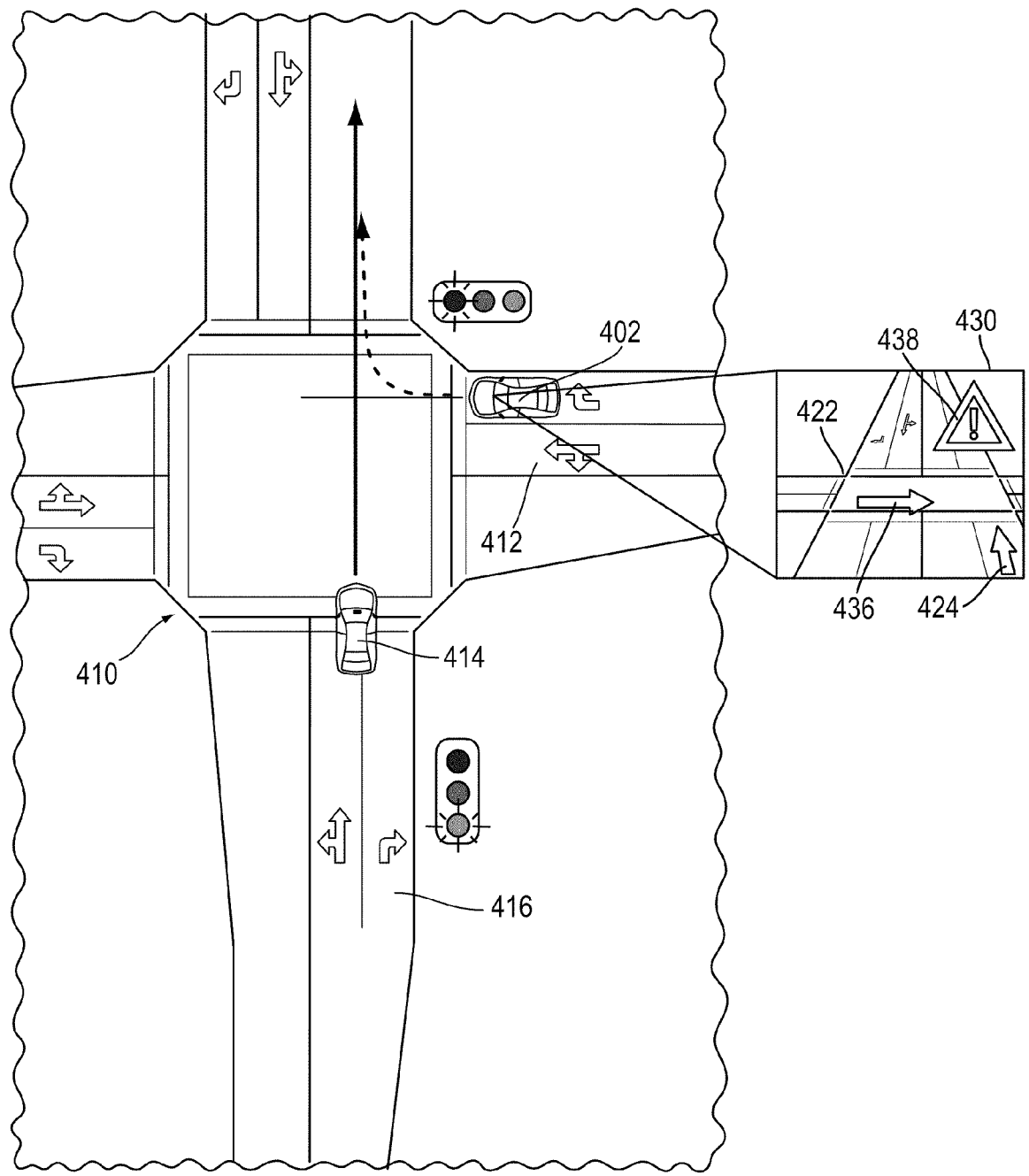

FIGS. 10 and 11 illustrate embodiments of a collision warning system 100 of a subject vehicle 102 in use as it approaches a road section for which it lacks sufficient detailed map data. Referring specifically to FIG. 10, subject vehicle 102 is shown approaching intersection 410 along second street 412 and target vehicle 414 is shown to the left of subject vehicle 102 approaching intersection 410 along first street 416, which is a cross street to second street 412. Suppose subject vehicle 102 has general map following capability, such as a GPS-based mapping system (not shown) discussed along with FIG. 1, but does not have preexisting detailed map data for the intersection. In such a case, subject vehicle 102 can determine it is approaching an intersection of roads based on GPS map data and its location, but it would lack detailed map data for intersection 410, such as whether first street 412 included one or two lanes. Suppose further that subject vehicle 102 had not communicated with any supplemental vehicles that were crossing or that had recently crossed intersection 410 and, thus, lacks any map or travel history information from those potential sources.

Without having lane configuration and other detailed map data for the intersection, collision warning system 102 can estimate a vehicle collision point 418 based on an assumed lane configuration. For example, it could assume a single crossing lane for first street 416 as a safe assumption, but which could result in unnecessary alerts being provided. The assumed lane configuration can be a default configuration for an intersection or for particular types of intersection for cases when subject vehicle 102 lacks map data for the intersection or when the map data may not be up to date or reliable.

In this situation shown in FIG. 10, collision warning system 100 can provide a low level warning 420 as subject vehicle 102 approaches intersection 410. Likewise, as shown in FIG. 11, collision warning system 100 can provide a high level warning 430 as subject vehicle 102 enters or comes close to entering the intersection to make a right turn. Thus, collision warning system 102 assumes a worse scenario than reality (i.e., that first street 416 has a single lane in the direction subject vehicle 102 intends to turn), and issues unnecessary warnings. However, even in this situation, subject vehicle 102 can take actions to improve future encounters with the intersection by creating a path history of its path through intersection 410. It can use this information for future mapping of the intersection and to share with other vehicles for their benefit.

Figure 12:
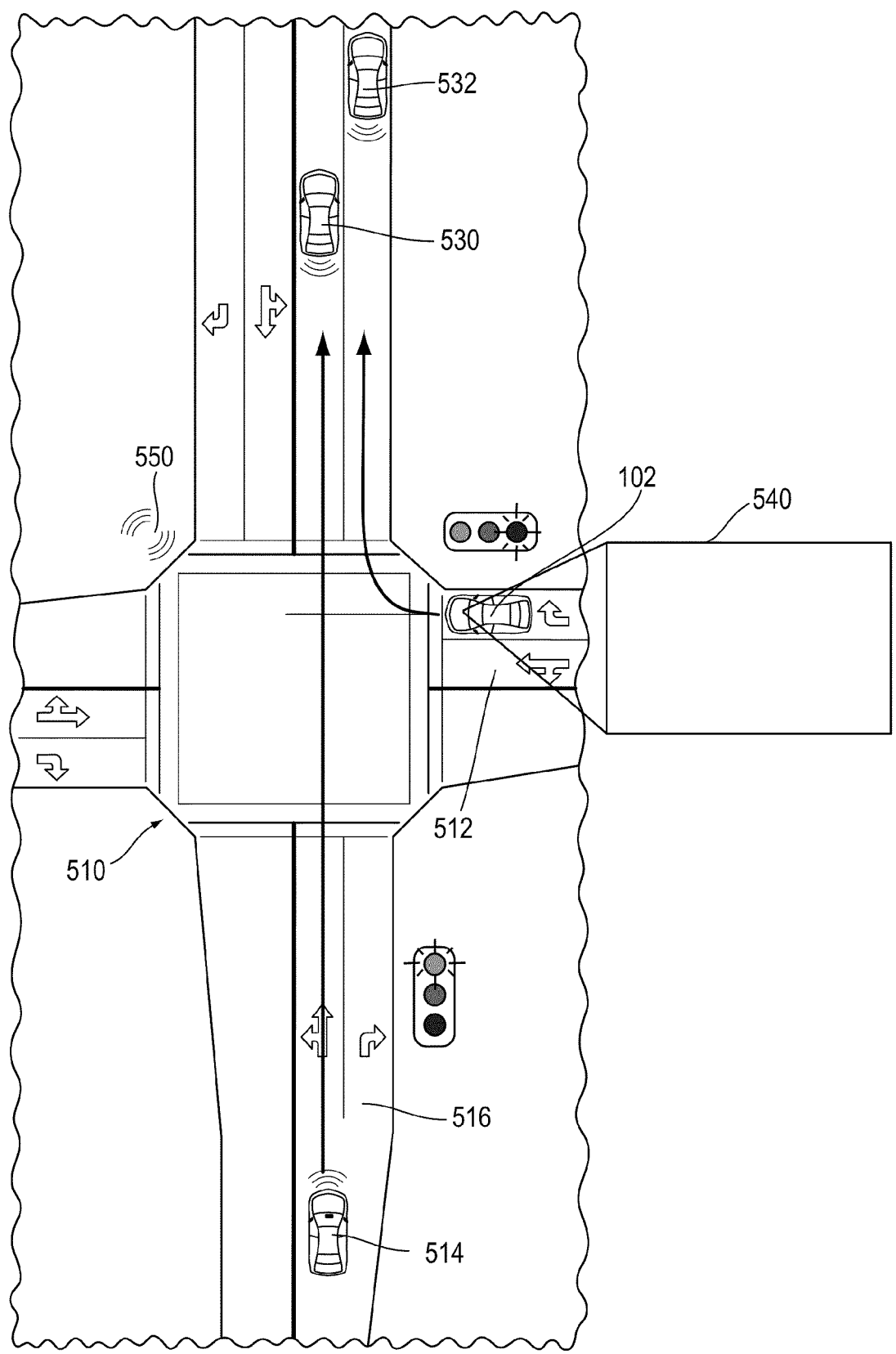
FIG. 12 is a schematic view of a configuration involving a subject vehicle, target vehicle and supplemental vehicles proximate an intersection.

FIG. 12 illustrates another example of a collision warning system 100 of a subject vehicle 102 during use that includes interacting with supplemental cross vehicles 530 and 532 to estimate detailed road section map data. Assume for the illustration that supplemental vehicles 530 and 532 are vehicles similar to subject vehicle 102 and each having map matching navigation systems, such as GPS-based systems, and capabilities for communicating with subject vehicle 102 through a vehicle communications network, such as a DSRC network. Suppose as an example that first supplemental vehicle 530 can calculate via its navigation system that its path through the intersection was offset from the center of the intersection by certain distance, such as an average number of meters. It can communicate to subject vehicle 102 this information as part of its travel history information for the intersection including its path information. Suppose further that second supplemental vehicle 532 traveling the same direction as the first vehicle can calculate it was offset twice the distance from the center of the intersection as the first supplemental vehicle 530. It can also communicate this information to subject vehicle 102 as part of its travel history information for the intersection including its path information.

Subject vehicle 102 can take advantage of this information to estimate detailed map data for the intersection. In particular, it can evaluate the travel history information it received for the intersection from these vehicles and estimate map data. Thus, subject vehicle 102 can determine that there are probably at least two lanes in the road they traveled immediately after the intersection in their direction of travel. Based on this information, collision warning system 100 can estimate potential intersection hazards, such as whether the projected path of subject vehicle 102 would be in the path of oncoming target vehicle 514. Thus, in the scenario illustrated in FIG. 12, collision warning system 100 can determine that subject vehicle 102 can safely turn right into a separate lane than the one being used by target vehicle 514. Under these conditions, collision warning system 100 can provide default screen 540 without issuing an unnecessary alert.

In other embodiments and configurations, improvements can be realized such as the confidence level and detail of the estimated map data. For instance, over time subject vehicle 102 can receive supplemental information from additional vehicles that have traversed the intersection, and it can store its own travel history information for times it has traversed the intersection, which can both increase the confidence level, accuracy and amount of detail in the estimated intersection map data. Also, vehicles traversing the intersection can broadcast stored intersection path history information and estimated intersection map data automatically as they approach the intersection to improve operation of the process, but they could also provide this information to other vehicles upon request.

Optionally, vehicles providing their travel history and other information for the road section can also provide a confidence level corresponding with the data they provide, which can be used by subject vehicle 102 or other vehicles receiving the information to provide even greater reliability and accuracy.

As an example, a confidence level can be calculated based on factors like how recent is the information used to prepare the estimated map data, the number of path histories included, the number of vehicles providing the path histories, the number of different paths for the road section, etc. This information can include other data such as traffic pattern information that can further assist with identifying the intersection's topology. For instance, common maneuvers by vehicles on certain paths through the road section may indicate a pot hole or obstruction, and common traffic stopping patterns may indicate signage, such as a stop or yield sign, which can be used to better identify the road section's topology and configuration for use by the collision warning system.

Further, composite information can be used to enhance even further the accuracy of the data. For instance, supplemental vehicles can provide subject vehicle 102 with composite intersection information they have received from yet other vehicles for the intersection, which can allow for greater accuracy from evaluating many path histories obtained by multiple vehicles. This composite intersection map data can become highly detailed and used for other purposes, such as to estimate the stopping locations of the intersection for systems that monitor vehicle behavior in relation to the intersection.

In yet other configurations, estimated map data and travel history information including path histories can be transmitted from subject vehicle 102, supplemental vehicles 530 and 532, and other vehicles to a repository for the intersection, such as local road side device 550 shown in FIG. 12. Road side device 550 can provide composite map data and related information that is continually improved to approaching vehicles for use by their collision warning systems or navigation systems.

Additionally, in other configurations, the accuracy of navigation system data used for path histories, such as GPS data, can be augmented through the use of received corrections from a remote site. For instance, a site that is part of a centralized system providing navigation information or map data to vehicles and other entities, such as road side device 550, can be provide navigation data corrections to increase the accuracy of the lane measurements and estimations. Additionally, it is understood that the estimated map data discussed in these examples can be used by vehicles in ways other than the scenarios shown including many scenarios beyond a vehicle turning at an intersection. For example, cross vehicles like target vehicle 414 can use estimated intersection information and related information received from subject vehicle 102 for its own tracking and collision warning calculations. For instance, information like subject vehicle having its blinker on can be factored into the target vehicle's calculation of risk that subject vehicle 102 could potentially turn in front of it while traveling at a high rate of speed.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes can be made within the scope of the attached claims.

I claim:

1. A method of operating a collision warning system in a motor vehicle comprising:
    mapping a road section proximate the motor vehicle including:

receiving vehicle travel history information for the road section from a transmitter proximate the road section;

evaluating potential paths for the road section based on the vehicle travel history information;

wherein the road section includes an intersection between a first road and a second road; and wherein the step of evaluating potential paths for the road section further includes estimating a lane configuration on the first road as it exits the intersection using the received vehicle travel history information for the road section;

determining a first path for the motor vehicle to traverse the road section including at least one lane associated with the estimated lane configuration for the intersection;

receiving a signal transmitted by a target vehicle;

determining a second path for the target vehicle to traverse the road section including at least one lane associated with the estimated lane configuration for the intersection; and calculating a threat of collision for the motor vehicle with the target vehicle including comparing the first and second paths.

2. The method according to claim 1, wherein, for receiving vehicle travel history information, the transmitter proximate the road section includes a roadside device.

3. The method according to claim 1, wherein, for receiving vehicle travel history information, the transmitter proximate the road section includes at least one supplemental vehicle.

4. The method according to claim 3, wherein the at least one supplemental vehicle includes a plurality of supplemental vehicles and evaluating potential paths for the road section includes comparing the vehicle travel history information from the plurality of supplemental vehicles for the road section.

5. The method according to claim 4, wherein the vehicle travel history information from the plurality of supplemental vehicles includes positional data for the vehicles determined from a navigation system for each of the plurality of supplemental vehicles.

6. The method according to claim 5, wherein each of the navigation systems includes a GPS-based system and the positional data includes vehicle travel history coordinates determined from GPS data.

7. The method according to claim 5, wherein the step of evaluating potential paths for the road section further includes estimating the lane configuration of the first road using the positional data associated with paths traveled by the supplemental vehicles for traversing the road section included in the vehicle travel history information.

8. The method according to claim 1, further comprising:

prior to the step of mapping the road section, determining that ma data including detailed information regarding the intersection is not available when the motor vehicle is approaching the road section.

9. The method according to claim 1, wherein:

the first path includes the motor vehicle turning from the second road to the first road as it traverses the intersection;

the second path includes the target vehicle crossing the intersection along the first road;

wherein the step of determining the first path includes identifying a first lane associated with the estimated lane configuration on which the motor vehicle can turn when following the first path;

wherein the step of determining the second path includes identifying a second lane associated with the estimated lane configuration on which the target vehicle can travel when following the second path; and wherein the step of comparing the first and second paths includes evaluating whether the first and second lanes are different lanes on the first road as it exits the intersection.

10. The method according to claim 1, wherein, for receiving vehicle travel history information, the transmitter includes a plurality of supplemental vehicles having crossed the intersection and traversed a portion of the first road where it exits the intersection, and the vehicle travel history information includes positional data for the plurality of supplemental vehicles when they each crossed the intersection and traversed the portion of the first road.

11. The method according to claim 1, further comprising creating map data for the road section.

12. The method according to claim 11, wherein creating ma data for the road section includes updating preexisting map data for the road section.

13. The method according to claim 11, wherein creating ma data for the road section includes building paths for the road section and storing the map data.

14. The method according to claim 13, wherein building paths for the road section includes adding additional paths for the road section to preexisting map data based on the received vehicle travel history information.

15. The method according to claim 1, further comprising determining if preexisting map data is available for the road section and, if so, determining if the map data has been updated within a recent time period.

16. The method according to claim 15, further comprising, if preexisting map data is available for the road section, evaluating whether the received vehicle travel history information is consistent with the preexisting map data and, if so, evaluating potential paths for the road section based on the preexisting map data.

17. A motor vehicle comprising:

a transmitter configured to transmit signals on a vehicle communications network;

a receiver configured to receive signals on a vehicle communications network;

a navigation system; and a collision warning system configured to perform actions comprising:

mapping an upcoming road section identified by the navigation system, the mapping including:

receiving via the receiver vehicle travel history information for the road section from a transmitter proximate the road section;

evaluating potential paths for the road section based on the vehicle travel history information;

wherein the road section includes an intersection between a first road and a second road; and wherein evaluating potential paths for the road section further includes estimating a lane configuration on the first road as it exits the intersection using the received vehicle travel history information for the road section;

determining a first path for the motor vehicle to traverse the road section including at least one lane associated with the estimated lane configuration for the intersection;

receiving via the receiver a signal transmitted by a target vehicle;

determining a second path for the target vehicle to traverse the road section including at least one lane associated with the estimated lane configuration for the intersection; and calculating a threat of collision for the motor vehicle with the target vehicle including comparing the first and second paths.

18. The motor vehicle according to claim 17, wherein the collision warning system is further configured to compare travel history information for the road section received via the receiver for a plurality of supplemental vehicles.

19. The motor vehicle according to claim 17, wherein the collision warning system is further configured to transmit travel history information for the motor vehicle for the road section to other motor vehicles.

20. A method of operating a collision warning system in a motor vehicle, comprising:

dynamically mapping an upcoming road section for the motor vehicle traveling along a second road, the upcoming road section including an intersection of the second road with a first road, dynamically mapping the upcoming road section including:

receiving first vehicle travel history information for the road section from a first supplemental vehicle having recently traversed the intersection along the first road;

receiving second vehicle travel history information for the road section from a second supplemental vehicle having recently traversed the intersection along the first road; and estimating a lane configuration for the first road as it exits the intersection based on the received first and second vehicle travel history information;

receiving a signal transmitted by a target vehicle;

determining at least one lane associated with the estimated lane configuration for the intersection being traversed by the target vehicle based on the received signal transmitted by the target vehicle; and calculating a threat of collision for the motor vehicle with the target vehicle based on the estimated lane configuration and the at least one lane being traversed by the target vehicle.

* * * * *